US010074094B2

(12) United States Patent
Nair

(10) Patent No.: US 10,074,094 B2
(45) Date of Patent: Sep. 11, 2018

(54) GENERATING A USER PROFILE BASED ON SELF DISCLOSED PUBLIC STATUS INFORMATION

(75) Inventor: Rahul Nair, Santa Clara, CA (US)

(73) Assignee: EXCALIBUR IP, LLC, New York, NY (US)

( * ) Notice: Subject to any disclaimer, the term of this patent is extended or adjusted under 35 U.S.C. 154(b) by 1364 days.

(21) Appl. No.: 12/720,591

(22) Filed: Mar. 9, 2010

(65) Prior Publication Data

US 2011/0225048 A1    Sep. 15, 2011

(51) Int. Cl.
*G06Q 30/00*    (2012.01)
*G06Q 30/02*    (2012.01)
*G06Q 50/00*    (2012.01)

(52) U.S. Cl.
CPC ......... *G06Q 30/02* (2013.01); *G06Q 30/0251* (2013.01); *G06Q 30/0255* (2013.01); *G06Q 30/0261* (2013.01); *G06Q 30/0269* (2013.01); *G06Q 30/0271* (2013.01); *G06Q 50/01* (2013.01)

(58) Field of Classification Search
CPC ............... G06Q 30/02; G06Q 30/0251; G06Q 30/0255; G06Q 30/0261; G06Q 30/0269; G06Q 30/0271; G06Q 50/01
USPC .......... 705/14.49, 14.53, 14.58, 14.66, 14.67
See application file for complete search history.

(56) References Cited

U.S. PATENT DOCUMENTS

| 2007/0050389 | A1* | 3/2007 | Kim ....................... G06Q 30/02 |
| 2008/0294624 | A1* | 11/2008 | Kanigsberg et al. ............. 707/5 |
| 2009/0048913 | A1* | 2/2009 | Shenfield et al. ............. 705/14 |
| 2010/0153107 | A1* | 6/2010 | Kawai ................. G06F 17/2715 |
| | | | 704/240 |
| 2011/0276408 | A1* | 11/2011 | Toole ......................... 705/14.66 |
| 2012/0054205 | A1* | 3/2012 | Baluja et al. ................. 707/749 |

* cited by examiner

*Primary Examiner* — Raquel Alvarez
(74) *Attorney, Agent, or Firm* — James J. DeCarlo; Greenberg Traurig, LLP

(57) ABSTRACT

A method, device and/or medium for generating a user profile based on an online user's self disclosed public status information. An indication may be received of updates self-published by the user at one or more sites. At least one context regarding the user may then be determined based on the published updates, and the context(s) may be employed to infer at least one attribute of the user. A profile of the user may then be determined based at least on the inferred attribute(s). The determined profile may be employed to enable an advertisement to be provided to the user. In this way, a heuristic may be provided for predicting advertising content that may be of interest to the user based on self-published information about the user. Thus, relevant advertisements may be more accurately targeted to those users who may be most interested in their content.

18 Claims, 11 Drawing Sheets

Published Updates for Online User:

1002 — 2/15/20xx 0830
Eating breakfast, getting ready for medical conference in Jamaica!

1004 — 2/16/20xx 1240
Warm and sunny in Jamaica, reading a book on the beach

1006 — 2/22/20xx 1520
Returning home to San Francisco tomorrow, need to buy new shoes 1008 — 2/23/20xx 1845
Love my new X-Brand running shoes 1010 — 2/24/20xx 1030
Check out pictures from my Jamaica trip, at www.sml.com/abcde 1012 — 2/26/20xx 1845
Very busy at the clinic today; backlog of patients

GENERATING A USER PROFILE BASED ON SELF DISCLOSED PUBLIC STATUS INFORMATION

TECHNICAL FIELD

The invention is generally related to providing a profile of an online user based on self-published online user information, and employing the profile to enable advertisements and/or other relevant content to be provided to the online user.

BACKGROUND

Because users of the web often find themselves inundated with advertisements that may not be relevant to their interests, users may increasingly ignore advertisements. This in turn may lead to a reduced return on the advertising investments of those companies and individuals who seek to advertise products and/or services on the web. Moreover, although certain data regarding online users may be available, advertisers may be reluctant to employ such data to more narrowly target advertisements to users due to concerns about data accuracy and/or privacy.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 10A illustrates non-limiting examples of published updates by an online user;

DETAILED DESCRIPTION

Figure 1:
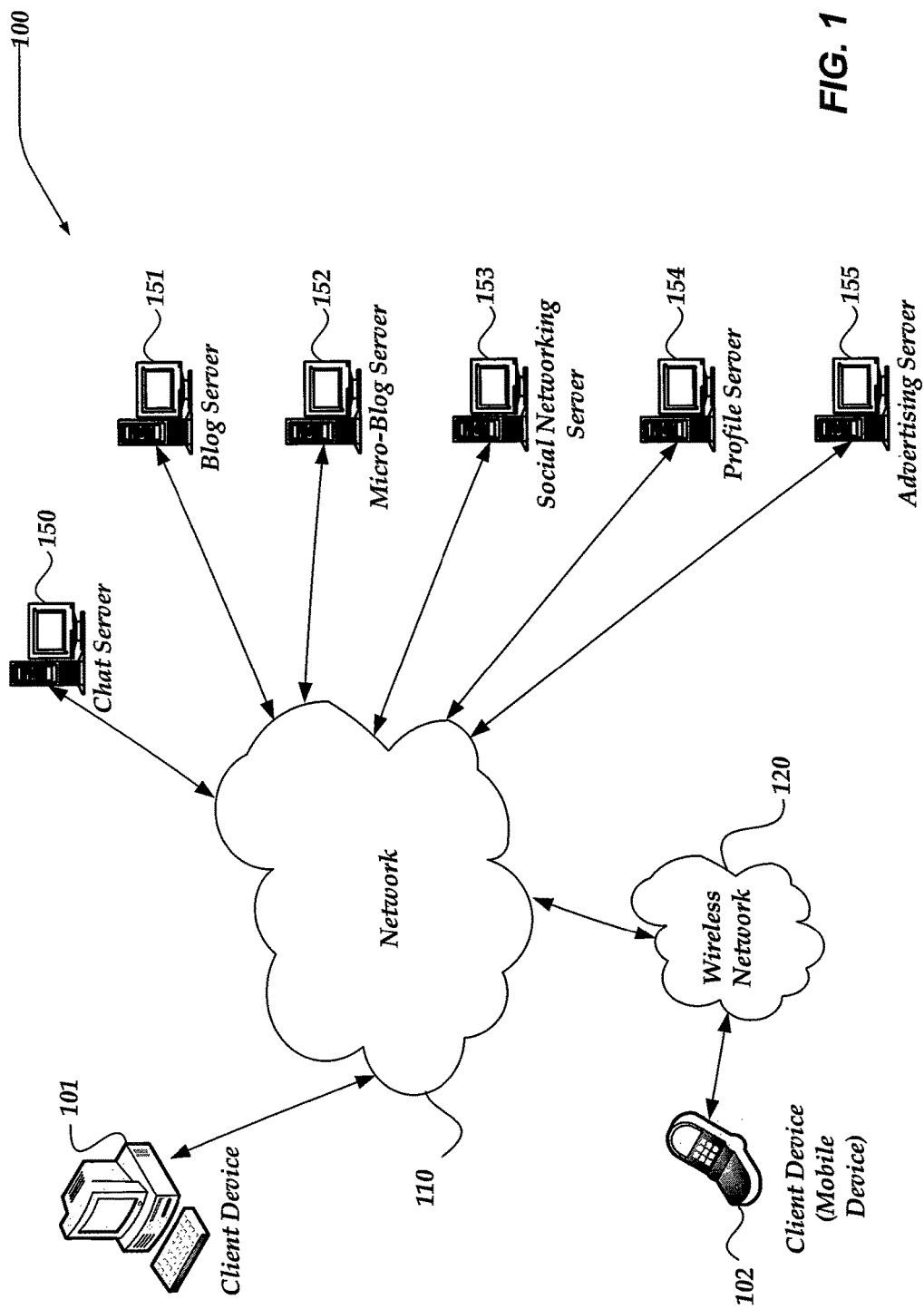
FIG. 1 is a system diagram of one example of an environment in which the various embodiments may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "published" includes virtually any activity by which an online user may make information about himself/herself available to the public, or to a certain subset of the public. For example, publishing may include posting information to a web site such as a social networking site, blog, micro-blog, online album, online forum, and the like. Publishing may also include sending a message such as in a chat session (e.g. instant messaging), an email, a text message (e.g. SMS, MMS) or any other form of messaging, including messaging that may be archived in such a way as to be more or less available to the public.

As used herein, the term "published update" includes virtually any information published by the online user (or by another user about the online user) to one or more web sites. For example, a published update may include information regarding the user including but not limited to the user's name, address, phone number, email address, location (e.g. geographical location), gender, orientation, political interests and/or affiliations, religion, ethnicity, physical statistics, other demographic data, professional and/or business interests, professional and/or business affiliations, current and/or past employment, educational background, relationship status. A published update may also include information regarding the user's current, past and/or future activities, including but not limited to leisure activities, hobbies, professional activities, past, current and/or future travel plans, past purchases of products and/or services, future intended or aspirational purchases of products and/or services, club affiliations, tastes in entertainment (e.g. films, books, games, sports, music, theater, television) and the like. Published updates may include status updates, related to the online user's location, state of being, health, mood, activity, interest, etc.

As used herein, the term "context" refers to a piece of information and/or data regarding the online user contained within or based on a published update. For example, a context may include information regarding the online user, such as the user's name, address, phone number, email address, location (e.g. geographical location), gender, orientation, political interests and/or affiliations, religion, ethnicity, physical statistics, other demographic data, professional and/or business interests, professional and/or business affiliations, current and/or past employment, educational background, relationship status. The context may also include information regarding the user's current, past and/or future activities, including but not limited to leisure activities, hobbies, professional activities, past, current and/or future travel plans, past purchases of products and/or services, future intended or aspirational purchases of products and/or services, club affiliations, tastes in entertainment (e.g. films, books, games, sports, music, theater, television) and the like. A context may also include information regarding other users or individuals that are acquainted with or known to the online user publishing the update. For example, a context may include information regarding one or more friends, family members, coworkers, acquaintances, activity partners, club members, or other individuals known to the online user. In some embodiments, a context may include a setting, a circumstance, a time, a place, or a general situation in which a published update occurs.

As used herein, the term "attribute" refers to a characteristic, trait, quality, interest or other descriptor of an online user, that is used either alone or in combination with other attributes to determine possible interests of the online user. An attribute may be inferred based on one or more contexts that are further determined based on published updates of the online user. Thus, an inferred attribute may in some embodiments be an external attribute for the online user. Types of attributes include, but are not limited to, leisure attributes, professional attributes, dating attributes, and demographic attributes. An attribute may be one or more of these types of attributes.

As used herein, the term "profile" refers to a set of information and/or data regarding the online user. In some embodiments, the profile may be a set, list, or other collection of the attributes inferred or otherwise determined for the online user. A profile may also include identifying information for the user, such as name, user name, nick name, login name, UID, email address(es), telephone number(s), address(es), demographic information (e.g., age, gender, nationality, languages spoken, religion), employment information, educational information, and so forth.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments of the present invention are directed towards generating a user profile based on self disclosed public status information (e.g. published updates). In some embodiments, this may include receiving an indication of at least one published update that is provided by the online user. Published updates may be published by the online user (e.g. self-published by the online user) at one or more of different types of web sites, including but not limited to online chat sites, social networking sites, blog sites, micro-blog sites, online albums and/or online forums. Published updates may include status updates related to the online user's location, state of being, health, mood, activity, interest, and the like. Certain embodiments may further determine at least one context regarding the online user based on the at least one published update. Moreover, certain embodiments may employ at least one context to determine (e.g. infer) at least one inferred attribute of the online user, and may generate, determine or otherwise provide a profile of the online user based at least in part on the determined at least one inferred attribute. Certain embodiments may further employ the profile to enable an advertisement to be selected and provided to the online user, the advertisement selected based on, or otherwise associated with, at least one inferred attribute of the online user included in the profile.

In this way, at least some embodiments may provide a heuristic for predicting advertising content that may be of interest to the user, based on the self-published information about the user. Thus, relevant advertisements may be more accurately targeted to those users most likely to be interested in the content of the advertisements. Moreover, because the information being used to determine advertisements is self-published by the user, embodiments of the claimed invention may overcome certain privacy-related concerns arising from the use of user data to target advertisements to users. Further, the certain embodiments may provide a more accurate way of determining advertisements that might be of interest to a user, because self-published updates of the user may more accurately reflect the user's external projection of themselves than other types of user data collected on the web.

In some embodiments the profile of the online user may include inferred attributes that are public attributes. However, in some embodiments the profile may also include inferred attributes that are more accurately described as published attributes instead of public attributes. That is, the inferred attributes may correlate more closely with the online user's external projection of themselves (e.g. an online persona, how they wish to be seen, perceived, or otherwise thought of by others) than with the actual attributes of the online user. Thus, in some embodiments the inferred attributes of the online user may be those outwardly visible attributes that the user has chosen to make visible via their published status updates, which may differ from actual attributes of the user determined through some other method.

Illustrative Operating Environment

FIG. 1 shows an example of an environment in which some embodiments of the invention may be practiced. Not all the components may be required to practice the invention, and variations in the arrangement and type of the components may be made without departing from the spirit or scope of the invention. As shown, system 100 of FIG. 1 includes network 110. In some embodiments, network 110 may be the Internet. However, network 110 may generally be any communications network allowing communication between computing devices, network devices, or other devices enabled for communication over a network, such as a local area network ("LAN") or wide area network ("WAN"). In some embodiments, system 100 may also include a wireless network 120 in communication with network 110.

Network 110 may be configured to couple network devices with other computing devices, including but not limited to client device 101, chat server 150, blog server 151, micro-blog server 152, social networking server 153, profile server 154, advertising server 155, and through wireless network 120 to mobile client devices such as client device 102. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links. Furthermore, remote computers and other related electronic devices could be remotely connected to either LANs or WANs via a modem and temporary telephone link. Thus, network 110 may include any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Wireless network 120 may be configured to couple mobile client devices such as mobile device 102 and its components with network 110. Wireless network 120 may include any of a variety of wireless sub-networks that may further overlay stand-alone ad-hoc networks, and the like, to provide an infrastructure-oriented connection for mobile device 102. Such sub-networks may include mesh networks, Wireless LAN (WLAN) networks, cellular networks, and the like. Wireless network 120 may further include an autonomous system of terminals, gateways, routers, and the like connected by wireless radio links, and the like. These connectors may be configured to move freely and randomly and organize themselves arbitrarily, such that the topology of wireless network 120 may change rapidly.

Wireless network 120 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile device 102 with various degrees of mobility. For example, wireless network 120 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 120 may include virtually any wireless communication mechanism by which information may travel between client devices such as mobile device 102 and other computing devices, networks, and the like.

System 100 may also include one or more client devices, such as client device 101 and/or mobile device 102. Client device 101 may include virtually any computing device that typically connects using a wired communications medium, including but not limited to personal computers, microprocessor systems, microprocessor-based and/or programmable consumer electronics, network appliances, notebook computers, desktop computers, and the like. In some embodiments, client device 101 may be configured to operate over a wired and/or a wireless network. An exemplary client device 101 (e.g. a network device) is described herein with regard to FIG. 3. Client device 101 and mobile device 102 may include virtually any computing device capable of receiving and sending a message or other information over a network, such as network 110, wireless network 120, or the like. The information may include social networking information, information related to performing search queries, or the like. Client device 101 and mobile device 102 may also include client applications such as those described further herein, and may configured to provide status updates such as information related to location, products, services, activities, or other information related to the status of the user.

Mobile devices such as mobile client device 102 may also be described generally as client devices that are configured to be portable. Thus, mobile device 102 may include virtually any portable computing device capable of connecting to another computing device and receiving information. Mobile device 102 may include portable devices such as cellular telephones, smart phones, display pagers, radio frequency (RF) devices, infrared (IR) devices, Personal Digital Assistants (PDAs), handheld computers, laptop computers, wearable computers, tablet computers, portable network appliances, integrated devices combining one or more of the preceding devices, and the like. As such, mobile devices such as mobile device 102 may vary in terms of capabilities and features. For example, a cellular phone may have a numeric keypad and a few lines of monochrome LCD display on which only text may be displayed. In another example, a web-enabled mobile device may have a touch sensitive screen, a stylus, scroll wheel, and several lines of color LCD display in which text, graphics, and/or images may be displayed. An exemplary mobile device 102 is described in more detail with regard to FIG. 2.

Client device 101 and/or mobile device 102 may be web-enabled, and may include a browser application that is configured to receive and to send web pages, web-based messages, and the like. The browser application may be configured to receive and display graphics, text, multimedia, and the like, employing virtually any web based communication protocol, including wireless application protocol (WAP), and the like. In some embodiments, the browser application may be enabled to display, interpret and/or generally process information (e.g. websites) in various languages, such as Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to perform a search over a network. However, another application may also be used to perform a search over the network.

Client device 101 and/or mobile device 102 also may include at least one other client application that is configured to receive content or other information from another computing device. The client application may include a capability to provide and receive textual content, graphical content, image content, audio content, and other types of content. The client application may further provide information that identifies itself, including a type, capability, name, and the like. In one embodiment, client device 101 and/or mobile device 102 may identify themselves (uniquely or otherwise) through any of a variety of mechanisms, including a phone number, Mobile Identification Number (MIN), an electronic serial number (ESN), MAC address, IP address, or other device identifier. The information may also indicate a content format that the mobile device is enabled to employ. Such information may be provided in a network packet, or the like, sent to one or more of the servers 150-155, or other computing devices on shown in FIG. 1.

Client device 101 and/or mobile device 102 may further be configured to include one or more client applications that enable the end-user to participate in one or more of a variety of online activities, including but not limited to: engaging in online chat; posting, editing, reading, or accessing content at a blog or micro-blog, including text content, audio content, video content (e.g. at a vlog), content feeds, messages, or the like; creating, updating, and/or editing an online profile for social networking, dating, professional, or business networking; or other online activities. However, client device 101, mobile device 102 and client applications are not constrained to providing and/or accessing the online services and content listed herein, and virtually any other form of services and/or content may be accessed and/or provided using client device 101 and/or mobile device 102 without departing from the spirit of the invention.

In some embodiments, one or more client applications executing on client device 101 and/or mobile device 102 may enable the end-user to log into an end-user account that may be managed by a server such as servers 150-155, or other computing devices, using an identifier such as a login name, user name, or other identifier. In some embodiments, such an identifier will uniquely identify the end-user with respect to other users. In some embodiments, such an identifier may be common to one or more end-users, and may be considered a group identifier. Login by the end-user may also require a password, passkey, certificate, or other security mechanism. In some embodiments, the client application may enable the end-user to participate in online activities without logging into an end-user account. An example of such a client application is the Client for Status Publication 248 shown in FIG. 2, and is described further herein.

In one embodiment, an end-user of client devices 101 and/or 102 may provide various content to one or more of servers 150-153, wherein the servers may include one or more services to host the content may be made accessible to others. In some embodiments, services available on servers 150-153 may enable an end-user to self-publish information, as described further herein. In one embodiment, the user might register with services provided by one or more of servers 150-153 to be able to host such content. In one embodiment, part of the registration may include providing information useable within a user profile about the end-user. The provided information might include, but is not limited to a user name, network address, and information about the content to be hosted, interests of the user, or the like. For example, in one embodiment, an end-user might provide for use in a user profile keywords identifying topics for which the end-user might be interested in, and/or topics for which the end-user may post articles, blog or micro-blog postings, or other content about.

In one embodiment, an end-user providing content to be published on one or more of servers 150-153 may be considered a content author. Such end-user may provide one or more keywords associated with a content item to be published. For example, where the end-user selects to post an article about a particular music video, the user might include keywords useable by others, such as "music," "video," "rock and roll," or the like. Client devices 101 and/or 102 may also be configured to enable an end-user to perform a search query for content that is provided by one or more of servers 150-153, by searching on one or more keywords associated with content.

Figure 3:
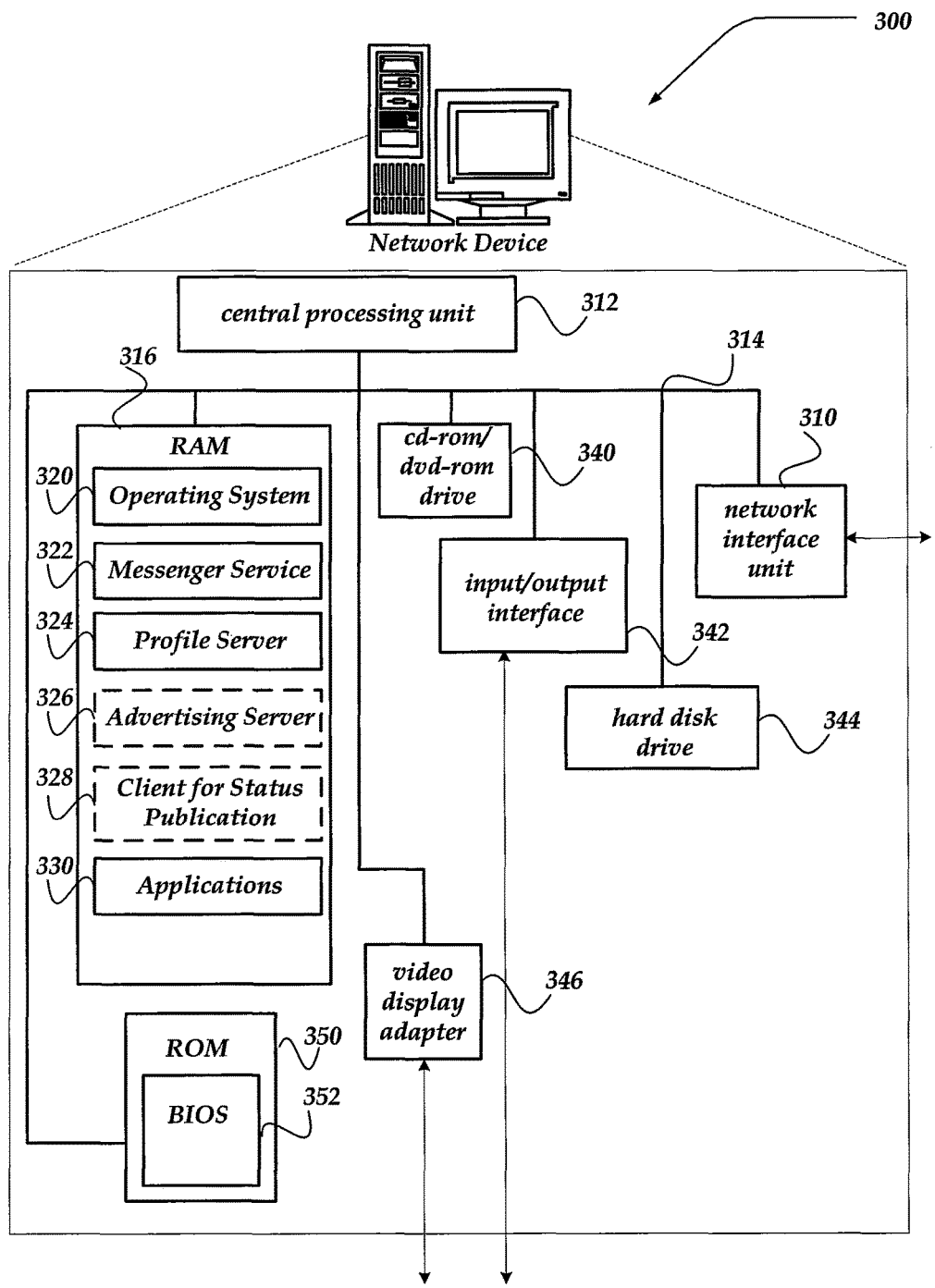
FIG. 3 shows one embodiment of a network device that may be included in a system such as that depicted in FIG. 1.

Servers 150-155 may generally be network devices, and are described in more detail with regard to the network device depicted in FIG. 3. Chat server 150, as shown in FIG. 1, may communicate with client devices 101 and/or 102 over network 110 and/or wireless network 120 to provide to end-users services generally related to online chat or messaging generally. Such services may include, but are not limited to, chat and/or messaging services such as instant messaging (IM), internet relay chat (IRC), Mardam-Bey's IRC (mIRC), Jabber-based chat services, and the like. Such chat and/or messaging services may enable the end-user to communicate with one or more other users in real-time, or with some delay between communications. Communication may be one-on-one between individual users (e.g. in a private chat session), or may be conducted in a group forum (e.g. in a group chat room). Communication may be text-based (e.g. users sending and receiving text messages), or may include video, audio, graphics, images or other content. In some cases, chat sessions may be archived so that the end-user may later access a transcript or other record of a chat session. Such chat records may be accessible to the user who created and sent the content (e.g., typed a chat entry or sent a video chat), and/or to the user who received the content. In some embodiments, such chat records may be public and accessible by users who were not directly involved in the chat session. Chat sessions may take place with varying degrees of anonymity for the users involved. For example, in some embodiments an end-user engaging in chat may appear to other users identified by their full name (e.g. Jane Smith), by a login name (e.g. jsmith1974), or by a randomly generated identifier (e.g. chatter24601). In some embodiments, client device 101 and/or 102 may include a specialized application (e.g., a chat client program) that enables the end-user to participate in chat sessions. In some embodiments, client device 101 and/or 102 may include a general application that provides chat capabilities when in communication with chat server 150.

Blog server 151 may communicate with client devices 101 and/or 102 over network 110 and/or wireless network 120 to provide to end-users services generally related to blogging. Such blogging (e.g. web logging) services may enable an end-user to publish status updates, notes, comments or other content that the end-user finds of interest, or that the end-user believes may be of interest to others. Blog entries may provide an end-user's commentary and/or news related to a particular subject (e.g. blogging regarding a particular sport) in which the end-user may have an expertise or an interest. Blog entries may also take the form of a more or less personal journal in which the end-user records their general experiences. Blog entries may be provided by the end-user as text entries, video or audio entries, and/or may include graphics, images or other content. Blog entries may also include hypertext or other types of links to other content (e.g., if the end-user wishes to direct a reader's attention to a news story). Blog entries may be published (e.g. self-published) by an end-user at blog server 151, and may be accessible to the general public. In some embodiments, blog entries of a particular end-user may be accessible to subscribers of a particular service. In some embodiments, an end-user's blog entries may only be accessible to other users with the end-user's permission.

Blog entries may be listed, for example, on a web page in chronological order, ordered by topic, or ordered in some other manner. In some embodiments, a blog may include entries of a single user, and/or may include entries of multiple users (e.g., a group blog or a corporate blog). Blog entries may be posted with a date/time of publication, may indicate the user who posted or otherwise published the entry, and may include one or more keywords indicating one or more topics, areas, genres, etc. A blog service may also enable users to post comments related to another user's blog post, comments related to comments, and so forth. In this way, a blog may facilitate a discourse or exchange of ideas between multiple users. In some embodiments, client device 101 and/or 102 may include a specialized application that enables the end-user to access, compose, edit, post or otherwise publish blog entries. In some embodiments, client device 101 and/or 102 may include a more or less general purpose application that communicates with blog server 151 and enables the end-user to access, compose, edit, post or otherwise publish blog entries.

Micro-blog server 152 may communicate with client devices 101 and/or 102 over network 110 and/or wireless network 120 to provide to end-users services generally related to micro-blogging. In some embodiments, micro-blogging may be considered a form of blogging that enables an end-user to self-publish or otherwise post brief text updates, images, audio or video clips. Such micro-blog entries may be accessible to all other users, or may be accessible only to a certain subset of users (e.g. subscribers). In some embodiments, those users that have access to a particular end-user's micro-blog posts are said to follow the end-user. Micro-blog entries may differ from blog entries in that micro-blog entries may be shorter in length. In some cases, there may be an upper limit on the number of characters in a micro-blog entry. Micro-blog entries may provide an end-user's commentary and/or news related to a particular subject (e.g. micro-blogging regarding a particular sport) in which the end-user may have an expertise or an interest. Micro-blog entries may also take the form of a more or less personal journal in which the end-user records their general experiences.

Micro-blog entries may be listed, for example, on a web page in chronological order, ordered by topic, or ordered in some other manner. Micro-blog entries may include a date/time when the entry was composed, posted or otherwise published. Micro-blog entries may also include the name, user name, or other identifier of the user who composed the entry (e.g. the author of the micro-blog entry). In some embodiments, micro-blog entries may include one or more keywords related to one or more topics, genres, and/or areas of interest of the content of the micro-blog entry. Such keywords may enable a user to display micro-blog entries published by a variety of users, all entries related to a particular subject (e.g. football). Micro-blog entries may be composed and published be an individual (e.g. in a personal daily diary/journal), or may be composed and published by one or more individuals in an organization (e.g. in a corporate micro-blog relating news about a company's products/services). Micro-blog postings may be related to one another, for example if one user posts a response to or a an otherwise related posting to another user's micro-blog posting. In some embodiments, client device 101 and/or 102 may include a specialized application that enables the end-user to access, compose, edit, post or otherwise publish micro-blog entries. In some embodiments, client device 101 and/or 102 may include a more or less general purpose application that communicates with micro-blog server 152 and enables the end-user to access, compose, edit, post or otherwise publish micro-blog entries.

Social networking server 153 may communicate with client devices 101 and/or 102 over network 110 and/or wireless network 120 to provide to end-users services generally related to social networking. Services provided by social networking server 153 may enable an end-user to establish an account and to create a social networking profile in which the end-user publishes information. Such information may include personal information regarding the end-user, including but not limited to the user's name, contact information (e.g. address, phone number, email address, chat nickname, and the like), geographical location, education and/or employment history, hobbies, interests, organizational affiliations and/or memberships, professional licensing and/or certification information, family information (e.g. spouse, children, parents, pets, and the like), or any other information that the end-user wishes to disclose or otherwise self-publish. Social networking services may also enable an end-user to identify friends, family members, coworkers, or other acquaintances such that these other users' social networking profiles are linked to the end-user. Such linkages may be displayed as part of the end-user's social networking profile; e.g., the user's social networking profile may include a list of the end-user's friends, family, coworkers or other acquaintances, the list displayed as part of the end-user's social networking profile.

In some embodiments, social networking services may enable a user to search user profiles for other users. Search criteria may generally include any information that is part of a user profile, or any combination (e.g. Boolean combination) of said information, and may facilitate new contacts or renewed acquaintance between users. For example, an end-user of a social networking service may wish to form a local hiking club, and to that end may search user profiles for other users in the same geographical area who are interested in hiking. An end-user's search query may search all users of the social networking system. In some embodiments, a search may be limited to those user profiles of users already directly known and linked to the end-user—friends, family members, coworkers, or other acquaintances (e.g. a first degree of separation). In some embodiments a search may be broader to encompass acquaintances of the end-user's linked acquaintances (e.g. a second degree of separation), acquaintances of acquaintances of acquaintances (e.g. a third degree of separation), and so forth.

Content published as part of a social networking profile may be textual, and may also include images, audio, video, graphics, or any other type of content. In some embodiments, client device 101 and/or 102 may include a specialized application that enables the end-user to access, compose, edit, post or otherwise publish information to a social networking user profile. In some embodiments, client device 101 and/or 102 may include a more or less general purpose application that communicates with social networking server 153 and enables the end-user to access, compose, edit, post or otherwise publish information to a social networking user profile. For example, a user's social networking user profile may be accessible, viewable, and/or editable as one or more web pages via a web browser.

Although FIG. 1 depicts examples of chat server 150, blog server 151, micro-blog server 152 and social networking server 153 as individual, separate servers within system 100, each of these servers may comprise a cluster of servers. Moreover, certain servers may provide functionality for one or more of the servers. For example, social networking server 153 may also provide chat, blog, and/or micro-blog functionality as part of its social networking services. In this example, an end-user may be enabled to post blog entries and/or micro-blog entries to the end-user's user profile to enable other users of the social networking service to access the end-user's blog and/or micro-blog postings. Further, social networking server 153 may also provide chat service that is more or less integrated with a social networking application. In other embodiments, chat server 150, for example, may be integrated with a social networking service so that users engaged in a chat session may access a link or other control to enable access to social networking user profiles of other users in the chat.

Profile server 154 may communicate with client devices 101 and/or 102 over network 110 and/or wireless network 120, and may communicate with other servers to provide to services related to generating and/or accessing a user profile based on self-disclosed public status information. One embodiment of an operation of profile server 154 is described further herein with regard to FIGS. 4-10. Advertising server 155 may communicate with client devices 101 and/or 102 over network 110 and/or wireless network 120 to provide advertising content to end-users.

While servers 150-155 are depicted in FIG. 1 as distinct devices, the invention is not so limited. In some embodiments, various combinations of the functionality of servers 150-155 may be implemented within fewer devices than depicted, or may be distributed across a plurality of networked devices, without departing from the spirit of the invention.

Illustrative Mobile Client Device

Figure 2:
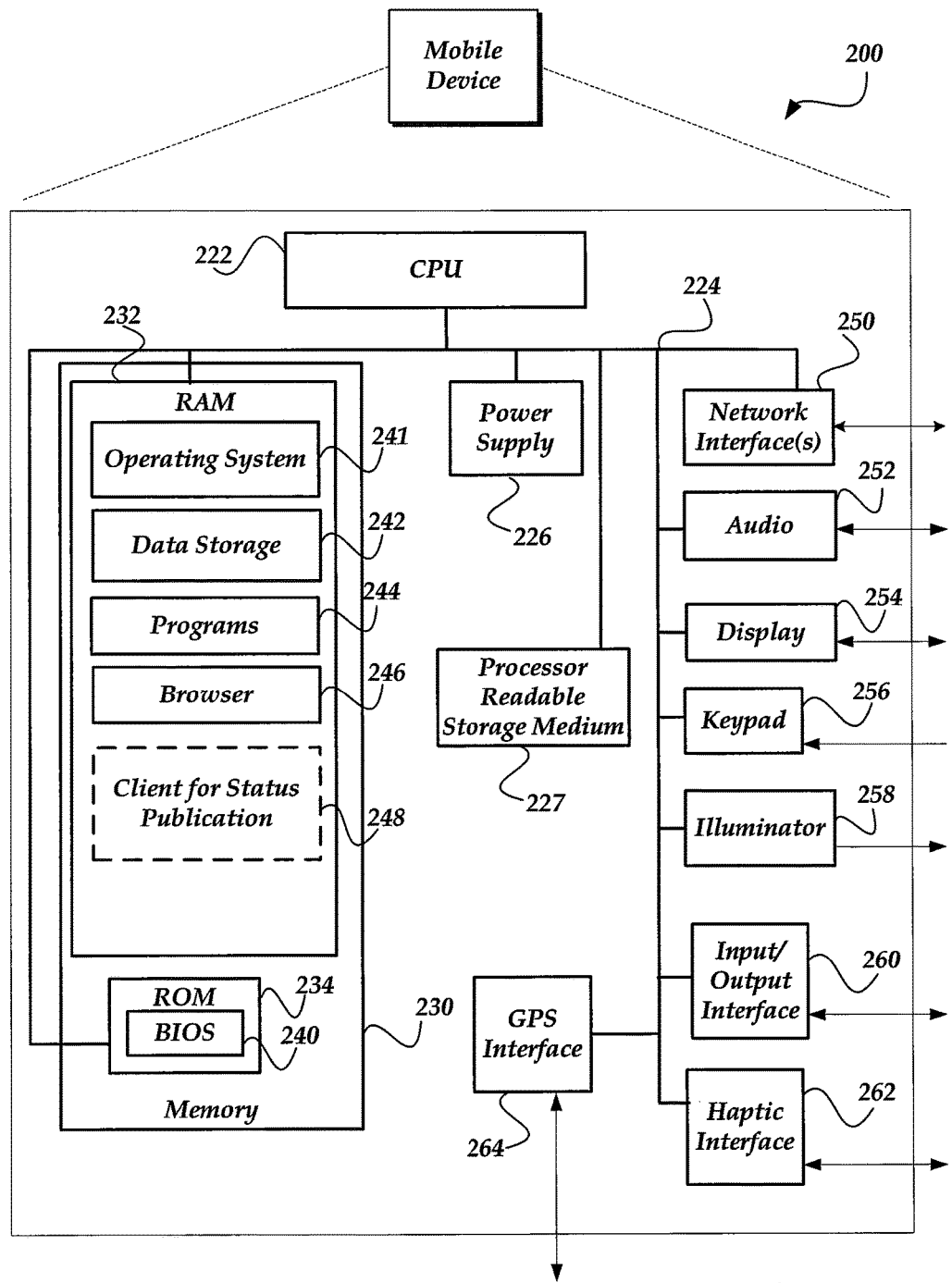
FIG. 2 shows one embodiment of a mobile client device that may be included in a system such as that depicted in FIG. 1.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Client device 200 may represent, for example, one embodiment of mobile client device 102 shown in FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer readable storage media (e.g. processor readable storage media) for storage of information such as computer readable instructions, data structures, program modules or other data. Mass memory 230 stores a basic input/output system ("BIOS") 240 for controlling low-level operation of mobile device 200. In some embodiments, BIOS may be stored in ROM 234. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, the Symbian® operating system, or other operating system. The operating system may include, or interface with a virtual machine module (e.g. a Java virtual machine) that enables control of hardware components, software components, and/or operating system operations via application programs that may execute within a virtual machine module.

Memory 230 further includes one or more data storage 242, which can be utilized by mobile device 200 to store, among other things, applications such as programs 244, browser 246, client for status publication 248, and/or other application or data. For example, data storage 242 may also be employed to store information that describes various capabilities of mobile device 200. The information may then be provided to another device based on any of a variety of events, including being sent as part of a header during a communication, sent upon request, or the like. Moreover, data storage 242 may also be employed to store data (cached or otherwise) related to chat, blogging, micro-blogging, and/or social networking functionality of mobile device 200. At least a portion of the information may also be stored on a disk drive or other computer readable storage medium (e.g. processor readable storage medium 227, or the like) within mobile device 200.

Programs 244 may include computer executable instructions which, when executed by mobile device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM or chat applications, SMS applications, VoIP applications, contact managers, task managers, transcoders, database programs, word processing programs, security applications, spreadsheet programs, games, search programs, and so forth. Other applications running within memory 230 may include, for example, browser 246 and client for status publication 248.

Browser 246 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may be employed. In some embodiments, browser 246 may enable messaging/chat, blog, micro-blog, and/or social networking functions by accessing online resources provided by messaging/chat, blog, micro-blog, and/or social networking servers.

Client for status publication 248 may provide functionality to enable the end-user to access one or more of chat, blog, micro-blog, social networking services and/or other services provided respectively by chat server 150, blog server 151, micro-blog server 152 and/or social networking server 153 of FIG. 1, and/or other servers not shown. Client for status publication 248 may, in some embodiments, comprise a specialized application engineered specifically to provide one or more of chat, blog, micro-blog, or social networking functions. For example, client for status publication 248 may be a chat client designed to provide chat functionality. In some embodiments, client for status publication 248 may be a general purpose application that provides one or more of chat, blog, micro-blog, or social networking functions, but may also enable other functions not necessarily related to chat, blog, micro-blog, or social networking. For example, client for status publication 248 may be an application that generally enables access to web sites and/or other online network resources, but also enables chat, blog, micro-blog and/or social networking functionality. Client for status publication 248 may provide similar functionality to browser 246, or vice versa, and functions of browser 246 may also enable chat, blog, micro-blog and/or social networking functionality. Although client for status publication 248 is depicted in FIG. 2 as a single application, in some embodiments more than one application may provide one or more of chat, blog, micro-blog and/or social networking functionality.

Illustrative Network Device

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, chat server 150, blog server 151, micro-blog server 152, social networking server 153, profile server 154, and/or advertising server 155 of FIG. 1. Moreover, network device 300 may represent client device 101 shown in FIG. 1.

Network device 300 includes processing unit 312, video display adapter 346, and a mass memory, all in communication with each other via bus 314. The mass memory generally includes RAM 316, ROM 350, and one or more permanent mass storage devices, such as hard disk drive 344, tape drive, optical drive, and/or floppy disk drive. The mass memory stores operating system 320 for controlling the operation of network device 300. Any general-purpose operating system may be employed. Basic input/output system ("BIOS") 352 is also provided for controlling the low-level operation of network device 300. As illustrated in FIG. 3, network device 300 also can communicate with the Internet, or some other communications network, via network interface unit 310, which is constructed for use with various communication protocols such as the TCP/IP protocol. Network interface unit 310 is sometimes known as a transceiver, transceiving device, or network interface card (NIC).

The mass memory as described above illustrates another type of computer-readable media, namely computer readable storage media (e.g. processor readable storage media). Computer readable storage media may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other storage devices and/or storage media which can be used to store the desired information and which can be accessed by a computing device.

Though not shown in FIG. 3, RAM 316 may include data storage for data related to various functions of network device 300, such as chat, blog, micro-blog and/or social networking functionality. Optionally, RAM 316 may also include data storage related to profile server and/or advertising server functionality of device 300. In one embodiment, at least some of the data may also be stored on another component of network device 300, including, but not limited to cd-rom/dvd-rom 340, hard disk drive 344, or the like.

The mass memory (including RAM 316) also stores program code and data. One or more applications 330 are loaded into mass memory and run under operating system 320. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth. Messenger service 322, profile server application 324, advertising server application 326, and/or client for status publication 328 may also be included as application programs within applications 330.

Messenger service 322 may include virtually any computing component or components configured and arranged to forward messages from message user agents, and/or other message servers, or to deliver messages to a local message store, or the like. Thus, messenger service 322 may include a message transfer manager to communicate messages employing any of a variety of email, message, and/or chat protocols, including, but not limited to Simple Mail Transfer Protocol (SMTP), Post Office Protocol (POP), Internet Message Access Protocol (IMAP), NNTP, SMS messages, IM, MMS, IRC, RSS feeds, mIRC, Jabber, or any of a variety of other message types and/or chat protocols. In some embodiments, messenger service 322 may enable users to initiate, respond to, and/or otherwise conduct chat sessions, IM sessions, video chat sessions, audio chat sessions, VoIP sessions, or the like. In some embodiments, messenger service 322 may be configured to interact with a web server or other process(es) to provide messenger and/or chat functionality.

Profile server application 324 may include virtually any computing components or components configured and arranged to generate, update, store, and/or provide one or more user profiles, each based on self-disclosed public status information of an end-user. Profile server application 324 may generate a user profile based on information published by an end-user participating in chat, blog, micro-blog and social networking activities, and may provide such user profile to an advertising server process, either running locally on the same network device or running on another device such as advertising server 155 as shown in FIG. 1. Exemplary operations of profile server application 324 are described in more detail herein with regard to FIGS. 4-10. Advertising server application 326 may include virtually any computing components or components configured and arranged to generate, identify or otherwise provide content (e.g. advertising content) to one or more end-users based on user profiles provided by profile server application 324.

Generalized Operation

The operation of certain aspects of the invention will now be described with respect to FIG. 4, which illustrates a logical flow diagram generally showing one embodiment of an overview process for providing a user profile based on self-disclosed public status information for an end-user. In some embodiments, process 400 of FIG. 4 may be implemented with profile server process 324 shown in FIG. 3, running on profile server 154 shown in FIG. 1, or on another network device.

Process 400 begins, after a start block, at block 402 where the process may receive an indication of at least one public identity of an online user. In some embodiments, indication of at least one public identity of the online user may include one or more names, logins, profile names or other identifiers that are associated with the online user for use with various web sites and/or public forums. For example, at block 402 the online user may provide user logins or other identifiers for online services such as social networking sites, blog sites, micro-blog sites, message service sites, online albums, or the like. Generally, a user login to an online service may identify the user uniquely and may be associated with the online user's account on an online service. In some embodiments, user login may be an email address of the online user, a user name (e.g. public user name), or some other identifier for the online user. In some embodiments, the online user may be prompted by the process for their user login(s) and not for any further authentication data (e.g. a password). In such cases, process 400 may access those published updates for the online user that are publicly available to any user browsing the social networking site, micro-blog site, etc. However, in some embodiments, the online user may also be prompted for further authentication data (e.g. a password), to enable embodiments of the invention to access information for the online user that is available behind a password authentication at the web site.

In some embodiments, process 400 may perform no further verification of the public identity information (e.g. logins) provided by the online user, and thus may trust that the user has provided public identify information that is accurate and that is associated with the online user (e.g. trust that the user has provided their own public identify information and not someone else's). However, in some embodiments, process 400 may perform further verification of the public identity information provided by the online user. For example, the process 400 may collect and analyze data regarding the online user from the various sites for which the online user provided identify information, and may verify that the identity information correctly identifies the user on each site. In a particular non-limiting, non-exhaustive example, the online user may provide a first login, jsmith, to social networking site X and a second login, josmith, to a micro-blog site Y. Process 400 may then examine a page associated with login jsmith at site X, and collect data referring to user name. John Smith. Process 400 may then examine another page associated with login josmith at micro-blog site Y, and collect data referring to user name John Smith. In this example, the positive correlation between the two sites (e.g., each refer to a user John Smith), may provide verification that the two logins provided are both associated with the same user.

At block 404, process 400 may collect timely published information for the at least one online identity received at block 402. This collection may include the collection of timely published information, where timely may be recently published information self-published by the online user within a certain predetermined time period (e.g., within the last week, the last month, the last year, etc.). The timely published information may be collected from some or all of the web sites for which the online user provided online identity information at block 402, and may include published updates published by the online user on each of the web sites within the predetermined time period.

Block 406 is described in more detail below in conjunction with FIG. 5. Briefly stated, at block 406 process 400 may receive an indication may be received of at least one published update that is provided by the online user (e.g., an end-user of devices 101 and/or 102). In some embodiments, such an indication may be received from a process that examines one or more public sites to determine whether the online user has published update(s) on the public sites. Such a process may execute periodically at predetermined times and/or intervals, may execute in response to a particular event or need, or may execute at the command of an operator or another process. In some embodiments, such a process may be implemented as a web crawler, spider, bot, or other type of computer program designed to examine multiple web sites in an automated manner. Such a process may examine a particular set or list of web sites that have been previously identified as sites where the online user may publish updates, or where users are generally enabled to publish updates, and may include those web sites where the online user has previously published updates. The web sites examined may also include those sites where the online user has a presence, in the form of an account, a profile, or the like. In some embodiments, the at least one published update may be a published update to the timely published information collected at block 404.

In some embodiments, receiving an indication of at least one published update may include determining a type of web site (e.g., blog, micro-blog, social networking site, chat service, online forum, online album site, or the like) where the at least one published update was published. Such determination may be based on an analysis of the content of the site to check for content that indicates that site is a particular type of web site, such as a title of a web page, a description of a web page, other data, and/or metadata included with one or more pages of the web site. Determination of a type of web site may also be made by searching for the URL and/or address of the web site in a list of known web sites of known types where status updates may be published by online users.

The published updates by the online user may include virtually any information published by the online user to one or more web sites. For example, a published update may include information regarding the user including but not limited to the user's name, address, phone number, email address, location (e.g. geographical location), gender, orientation, political interests and/or affiliations, religion, ethnicity, physical statistics, other demographic data, professional and/or business interests, professional and/or business affiliations, current and/or past employment, educational background, relationship status. A published update may also include information regarding the user's current, past and/or future activities, including but not limited to leisure activities, hobbies, professional activities, past, current and/or future travel plans, past purchases of products and/or services, future intended or aspirational purchases of products and/or services, club affiliations, tastes in entertainment (e.g. films, books, games, sports, music, theater, television) and the like. A published update may also include information regarding other users or individuals that are acquainted with or known to the online user publishing the update. For example, an online user's published update may include information regarding one or more friends, family members, coworkers, acquaintances, activity partners, club members, or other individuals known to the online user.

At block 406, a determination may be made that the indicated published update was published by the online user be examining certain characteristics or features of the published update that identify the online user as the author. For example, the published update may include the online user's name, nickname, login name, or other identifier that identifies the online user as the author of the published update. In some embodiments, the published update may be posted to a web page (e.g. an online profile on a social networking site, the online user's blog page or micro-blog page, and the like) that identifies the online user as an author of some or all of the postings on that web page.

Process 400 may then proceed to block 408 where it may determine at least one context regarding the online user based on the at least one published update. In some embodiments, a context may be a piece of information regarding the online user contained within the online user's published update. For example, a context may include information regarding the online user, such as the user's name, address, phone number, email address, location (e.g. geographical location), gender, orientation, political interests and/or affiliations, religion, ethnicity, physical statistics, other demographic data, professional and/or business interests, professional and/or business affiliations, current and/or past employment, educational background, relationship status. The context may also include information regarding the user's current, past and/or future activities, including but not limited to leisure activities, hobbies, professional activities, past, current and/or future travel plans, past purchases of products and/or services, future intended or aspirational purchases of products and/or services, club affiliations, tastes in entertainment (e.g. films, books, games, sports, music, theater, television) and the like. A context may also include information regarding other users or individuals that are acquainted with or known to the online user publishing the update. For example, a context may include information regarding one or more friends, family members, coworkers, acquaintances, activity partners, club members, or other individuals known to the online user.

Block 408 is described in more detail below with regard to FIG. 6. Briefly stated, at block 408 process 400 may determine a context based on a published update by analyzing the published update. In some embodiments, such analysis may include textually searching the published update for one or more predetermined keywords that may indication a context. For example, the process may search the published update for a keyword "sailboat", to determined a context "sailboat", "sailing", "boating" and the like. Block 408 may employ another process (e.g. a sub-process) to determine a context based on a published update.

Process 400 may then proceed to block 410 where it may employ the at least one context to determine at least one inferred attribute of the online user. In some embodiments, an attribute of the online user may be a characteristic, trait, quality, interest or other descriptor of the online user, that may be used either alone or in combination with other attributes to determine possible interests of the online user. Such an attribute may be determined (e.g. inferred) based on the at least one determined context. The at least one inferred attribute for the online user may be at least one of a leisure attribute, professional attribute, dating attribute, demographic attribute, or other type of attribute. Determining at least one inferred attribute of the online user is described in more detail below with regard to FIG. 7.

At block 412, process 400 may provide a profile of the online user, based at least in part on the at least one inferred attribute determined at block 410. In some embodiments, the profile may be a set, list, or other collection of the attributes determined for the online user. This step is described in more detail below with regard to FIG. 8.

Process 400 may then proceed to block 414 where the process may employ the profile to enable an advertisement or other relevant content to be provided to the online user. This step described in more detail below with regard to FIG. 9. After completing block 414, process 400 may terminate, or return.

Figure 4:
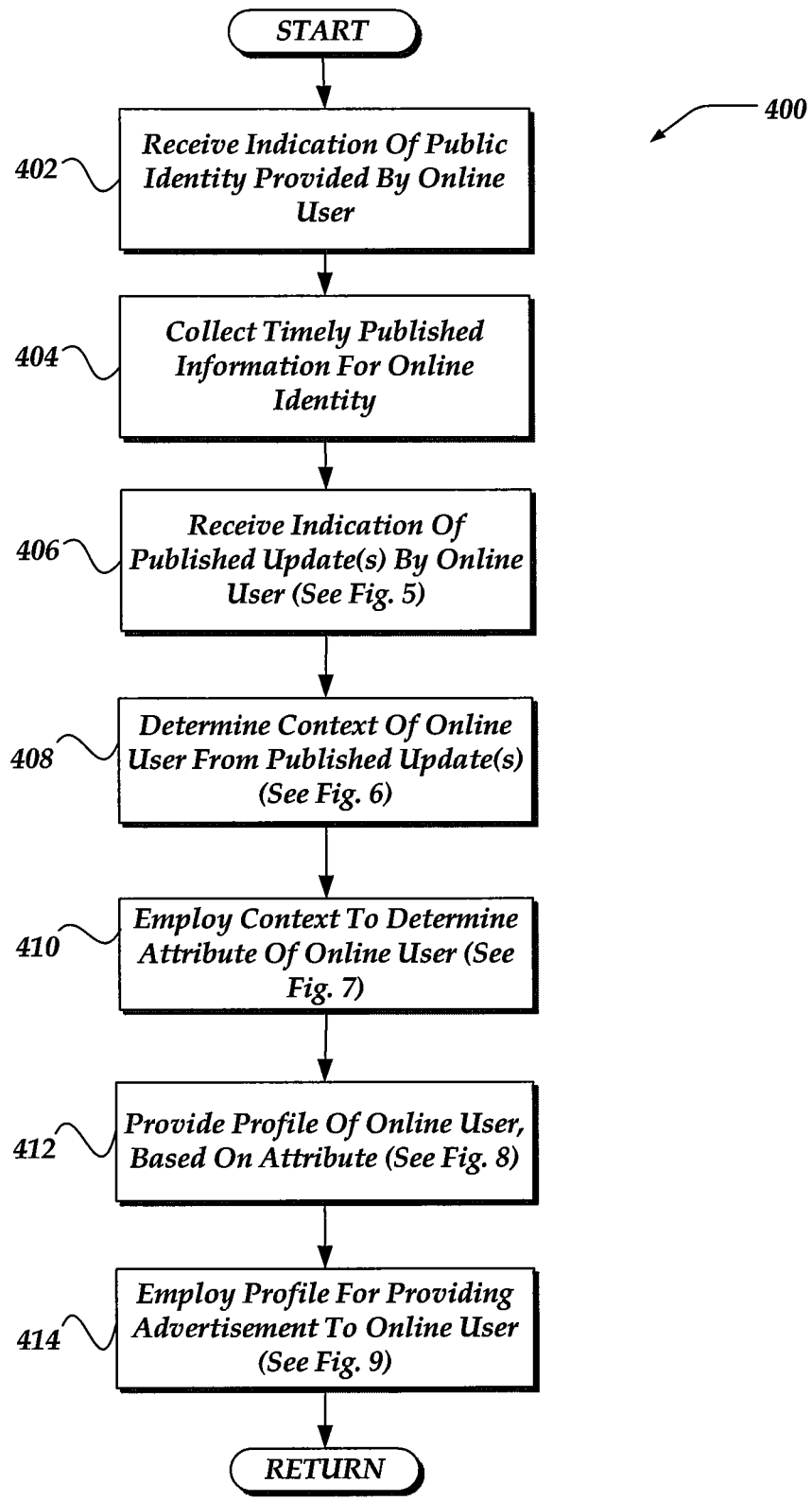
FIG. 4 illustrates a logical flow diagram generally showing one embodiment of an overview process of providing and employing a user profile based on self disclosed public status information.
Figure 5:
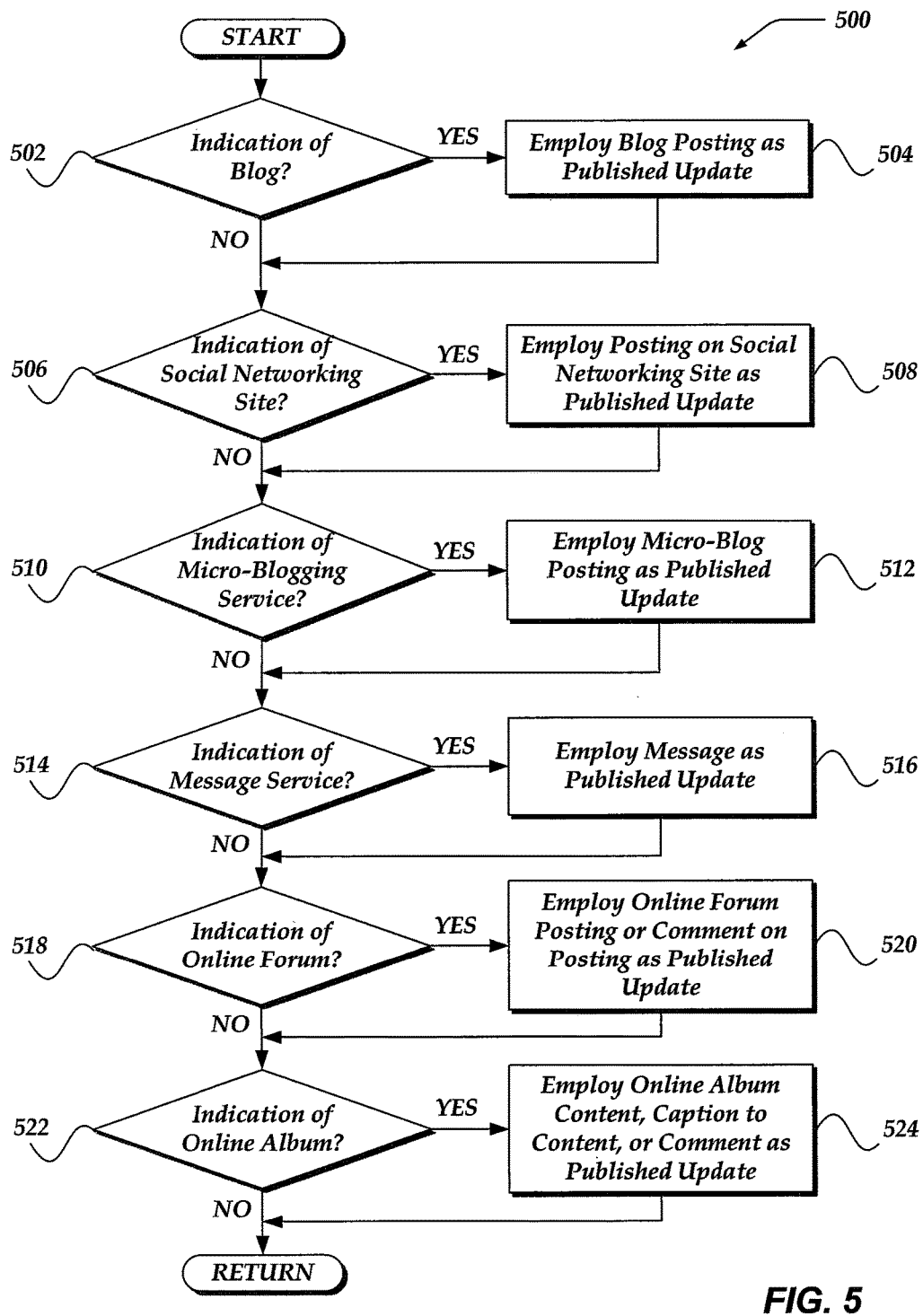
FIG. 5 illustrates a logical flow diagram generally showing one embodiment of a process of receiving one or more indications of published updates by an online user.

FIG. 5 provides an example of a process for receiving an indication of a published update by the online user, where such indication may be associated with various types of web sites and/or public forums as described with regard to block 406 of FIG. 4. Process 500 of FIG. 5 depicts a program or process that, in some embodiments, may run as a sub-process spawned from process 400 or as a separate, independently spawned process. In some embodiments, process 500 may be spawned from block 406 of process 400. In some embodiments, process 500 of FIG. 5 may be implemented with profile server process 324 shown in FIG. 3, running on profile server device 154 shown in FIG. 1, or on another network device. At decision block 502, the process 500 may determine whether a received indication of at least one published update was an indication of a blog. If it is determined that the indication is of a blog, then process 500 may proceed to block 504 and employ the online user's blog posting as a published update in subsequent processing. In some embodiments, comments by the online user to their own or to another user's blog posting may be employed as published updates provided by the online user.

At decision block 506, process 500 may determine whether a received indication of at least one published update was an indication of a social networking site. If it is determined that the indication is of a social networking site, then process 500 may proceed to block 508 and employ the information published and/or posted by the online user to the social networking site as one or more published updates in subsequent processing. At decision block 510, the process may determine whether a received indication of at least one published update was an indication of a micro-blogging site or service. If it is determined that the indication is of a micro-blogging service, then process 500 may proceed to block 512 and employ the online user's micro-blog posting as a published update in subsequent processing. In some embodiments, comments by the online user to their own or to another user's micro-blog posting may be employed as published updates provided by the online user.

At decision block 514 of process 500, the process may determine whether a received indication of at least one published update is an indication of a message service, such as a chat service (e.g., IM) or email service. If it is determined that the indication is of a message service, then process 500 may proceed to block 516 and employ the information published and/or posted by the online user in one or more messages as one or more published updates in subsequent processing. In some embodiments, status updates may be retrieved based on information saved by a message service in an archive of one or more previous message exchanges in which the online user participated. In some embodiments, process 500 may receive indication of a published update in a message session that is currently ongoing, such as a current chat session. In general, the message that is employed as a published update at block 516 may be the online user's own statement in a message. However, in some embodiments the message that is employed as a published update may include another user's statement to or about the online user.

At decision block 518, a determination may be made whether a received indication of at least one published update is an indication of an online forum. If it is determined that the indication is of an online forum, then process 500 may proceed to block 520 and employ the information published and/or posted by the online user to the online forum as one or more published updates in subsequent processing. In some embodiments, an online forum may be a public or semi-public site where various users may discuss any of a variety of topics (e.g., politics, sports, travel, entertainment, food, and the like). Users may post information to an online forum in the form of text (e.g. an article or shorter posting regarding a topic of interest), and other users may respond with their own postings, comments, comments to comments, and so forth. Postings to an online forum may also take the form of video, audio, images, graphics, and the like. Process 500 may employ a posting by the online user to an online forum as a published update, and/or may employ as a published update the online user's comment regarding their own or another user's posting.

At decision block 522, process 500 may determine whether a received indication of at least one published update is an indication of an online album. If it is determined that the indication is of an online album, then process 500 may proceed to block 524 and employ the information published and/or posted by the online user to the online album as one or more published updates in subsequent processing. In some embodiments, an online album may provide an online space for users to post or publish content such as images (e.g. vacation photos), video, audio, graphics, and the like. At block 524, process 500 may employ the online user's posted content itself as a published update for the online user. In some embodiments, the process may employ the online user's caption (e.g. text describing the content) as a published update. In some embodiments, if the online album enables users to comment on the content posted, the process 500 may employ the online user's comments to their own or to another user's content as published updates, and/or may employ as published updates other user's comments to the online user's content. Process 500 may then return, for example to block 406 of process 400 for continued processing.

Figure 6:
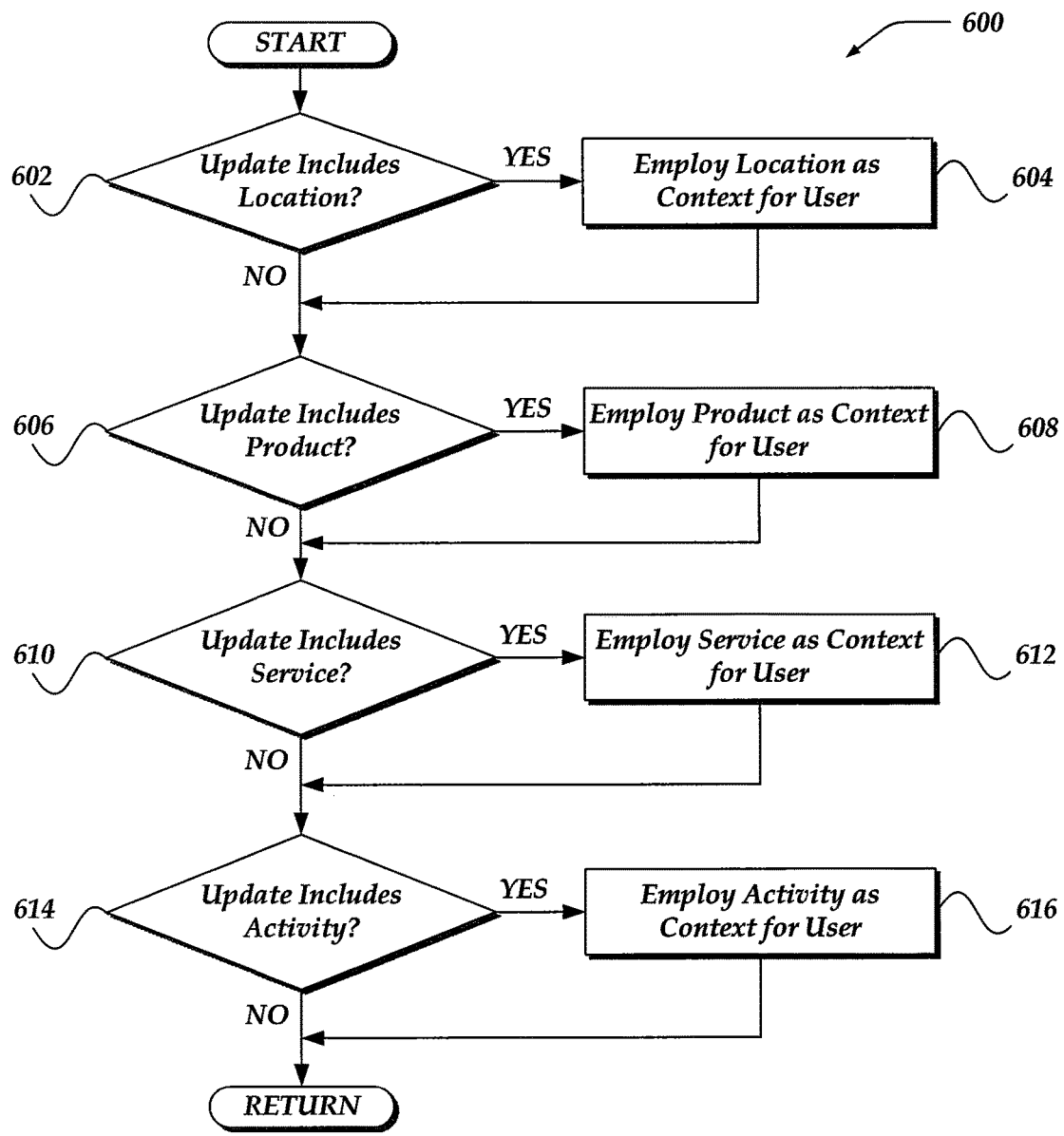
FIG. 6 illustrates a logical flow diagram generally showing one embodiment of a process of determining one or more contexts of an online user from published update(s)

FIG. 6 depicts an exemplary process for determining a context based on a published update. In some embodiments, process 600 shown in FIG. 6 may be spawned from block 408 of process 400. In some embodiments, process 600 may be implemented with profile server process 324 shown in FIG. 3, running on profile server device 154 shown in FIG. 1, or on another network device.

Process 600, after a start block, may proceed to decision block 602 where a determination is made whether the published update includes a location. If it is determined that the published update includes a location, process 600 may proceed to block 604 where the process may employ the location as a context for the online user. Otherwise, process 600 may proceed to decision block 606. In some embodiments, a location may be a geographic place name such as the name of a neighborhood, street, town, city, county, state, province, nation, continent, or the like. A location may also be a business name, building name, individual residence, or the like. A location may also be indicated by a set of coordinates (e.g. GPS coordinates and the like).

At decision block 606, a determination is made whether the published update includes a product. If it is determined that the published update includes a product, process 600 may proceed to block 608 where the process may employ the product as a context for the online user. Otherwise process 600 may proceed to decision block 610. In some embodiments, the process may search for particular product names to employ as a context for the online user. For example, the process may search for "BrandX" automobiles, and if it finds "BrandX" mentioned in one or more published updates the process may then employ BrandX as a context for the online user. In some embodiments, the process may search for broader categories of products. For example, the process may search for "automobile", "auto", "car" and the like, such that any mention of cars within the online user's published update would lead to a context of "car" for the online user. In general, the process may examine the published update at varying levels of specificity to determine a context for the online user based on the published update.

At decision block 610, a determination is made whether the published update includes a service. If it is determined that the published update includes a service, process 600 may proceed to block 612 where the process may employ the service as a context for the online user. Otherwise, process 600 may proceed to decision block 614. In some embodiments, the process may search for particular name of a service provider to employ as a context for the online user. For example, the process may search for "Dr. Krack Chiropractic", and if it finds "Dr. Krack Chiropractic" mentioned in one or more published updates the process may then employ "Dr. Krack Chiropractic" as a context for the online user. In some embodiments, the process may search for broader categories of services. For example, the process may search for "chiropractic" but not for any particular practitioner or provider of a service, such that any mention of chiropractic within the online user's published update would lead to employment of a context of "chiropractic" for the online user. In general, the process may examine the published update at varying levels of specificity to determine a context for the online user based on the published update.

At decision block 614, a determination is made whether the published update includes an activity. If it is determined that the published update includes an activity, process 600 may proceed to block 616 where the process may employ the activity as a context for the online user. An activity may be virtually any type of activity, including but not limited to a professional activity, business activity, leisure activity, family activity, or the like. If it is determined at decision block 614 that the published update does not include an activity, process 600 may return for example to block 408 of process 400.

In some embodiments, determination of at least one context for the online user from published updates may be based at least in part on certain characteristics of the published updates, such as age, freshness, frequency and the like. An age of a published update may be the amount of time that has passed between the publication of the published update and the time when analysis of the published update is performed. In some embodiments, a greater age of a published update may lead to a lower likelihood that the published update will be used to determine a context for the online user. In some embodiments, if the published update passes a certain predetermined threshold age (e.g., older than a week, older than a month, older than a year), process 600 may not employ the published update to determine a context for the user, and may consider the information too old to be useful in determining a context. Similarly, in some embodiments if the published update has not occurred frequently enough (e.g. has not surpassed a predetermined threshold frequency of occurrence on the web sites), that published update may not be used to determine a context.

Figure 7:
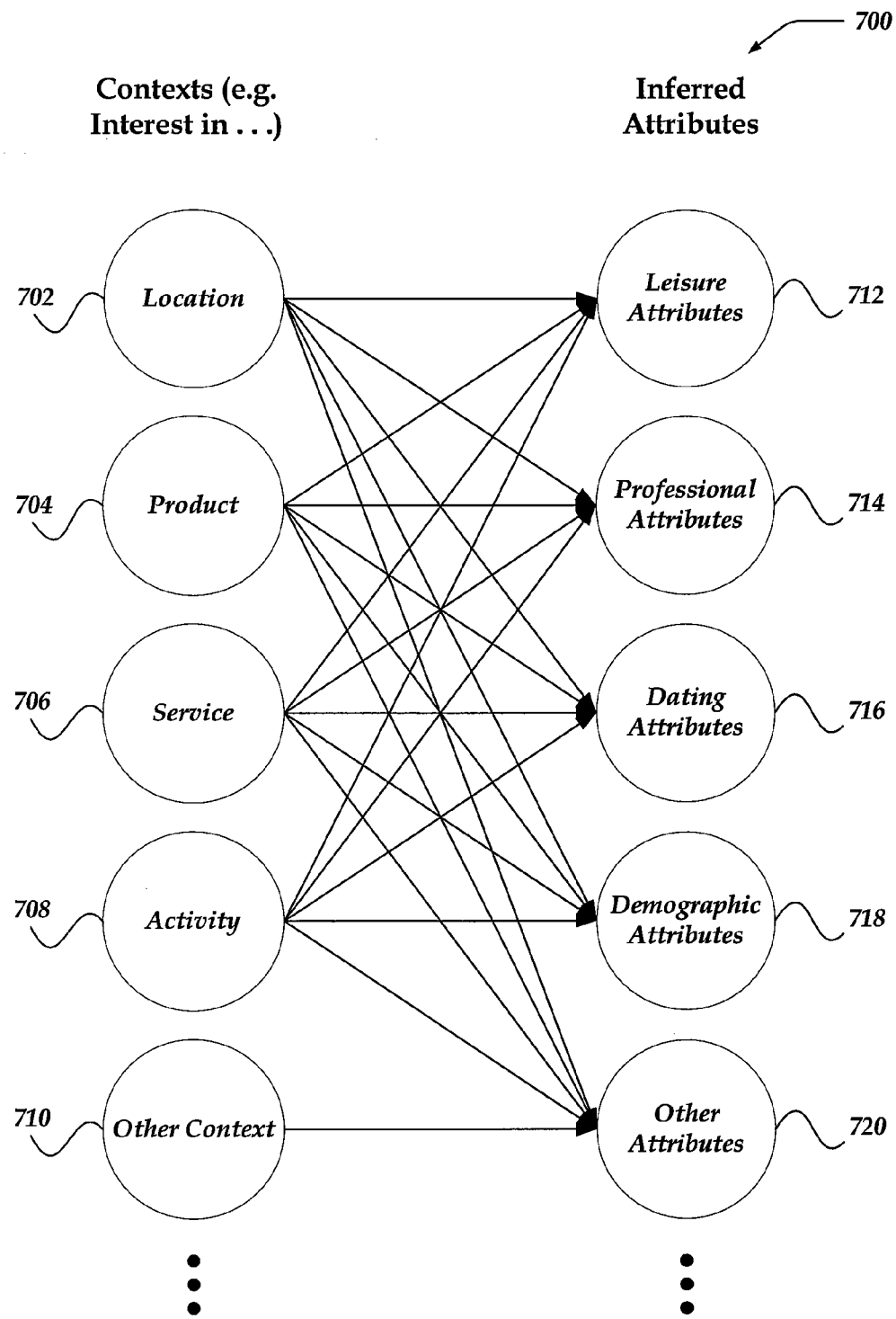
FIG. 7 illustrates a logical flow diagram generally showing one embodiment of a process of employing context(s) to determine one or more inferred attributes for an online user.

FIG. 7 depicts in more detail the determination of at least one inferred attribute based on at least one context for the online user, as discussed above with regard to block 410 of FIG. 4. In some embodiments, a determination of an inferred attribute of the online user may be made through a correlation of one or more contexts (e.g. interests) determined for the user. For example, as depicted in FIG. 7, individual contexts and/or combinations of multiple contexts such as location 702, product 704, service 706, activity 708 and/or other context 710 may be correlated to inferred attributes of the online user such as leisure attributes 712, professional attributes 714, dating attributes 716, demographic attributes 718, and/or other attributes 720. In some embodiments, determination of an inferred attribute based on a context may take the form of a mapping, such that a product context of "sailboat" leads to a determination of a leisure attribute of "sailing" for the online user.

Moreover, embodiments of the claimed invention may support a more complex analysis to infer attributes for the online user. For example, in some embodiments correlation of contexts may include one or more Boolean combinations of certain contexts to determine an inferred attribute. For example a location context of "Bahamas" AND a product context of "sailboat" may lead to determination of a leisure attribute of "sailing in the Bahamas" or "sailing in the Caribbean", or the like. Correlation of contexts to infer attributes may also include logical inferences of certain attributes from certain contexts. For example, a professional or leisure attribute of "frequent traveler" may be determined for the online user based on determinations of a frequently changing location context for the user, determinations of airline tickets as a service context for the user, or the like.

As another example, an online user may be associated with a context of traveling, and more specifically with traveling out of a particular city such as San Jose. If traveling out of San Jose is a frequent context associated with the user (perhaps over a predetermined period of time—e.g., traveling at least ten times out of San Jose in a year), then there may be an inferred attribute that the online user resides in San Jose. This inference may be made for the online user even though the online user has never explicitly stated in a published update that she resides in San Jose.

In some embodiments, determination of at least one inferred attribute based on the at least context may include determining a frequency at which the at least one context occurs in the online user's published updates, such that the at least one attribute is at least in part based on the determined frequency for one or more contexts. In such embodiments, aspects of the claimed invention may analyze the published updates for a particular context, but only infer an attribute based on that context if the context appears in the published updates at or above a certain frequency (e.g. a certain number of times). For example, a context of "sailboat" may lead to an inference of attribute "sailing" for the online user, if "sailboat" is found at or more than 10 times in the published updates of the online user. Thus, aspects of the claimed invention may infer an attribute based on the context if the context is determined at or more than a predetermined threshold number of times (or frequency). In some embodiments, such a frequency determination may be made within a certain period of time, such that a context would need to appear at or above a certain predetermined threshold number of times within a certain period of time (e.g., 10 times within a month), for that context to be employed to determine an inferred attribute for the online user.

In some embodiments, employing the at least one context to determine the at least one inferred attribute of the online user may include determining a number of sites (e.g. web sites) that publish the at least one published update used to determine the at least one context, and determining that the number of sites exceeds a predetermined threshold number. Thus, some embodiments of the claimed invention may determine that a particular context appears in published updates at a certain minimum number of sites before that particular context is employed to determine an inferred attribute of the online user. For example, embodiments of the claimed invention may determine a site number threshold of three before employing a context to determine an inferred attribute, such that a context of "sailboat" found in a published update on one site alone may not be sufficient, until that context appears in published updates on at least two other sites.

Some embodiments of the claimed invention may apply weights to contexts such that certain contexts carry greater weight than others in the determination of inferred attributes for the online user. Such weights may, in some embodiments, be related to the frequency determination and/or threshold number of sites determination discussed herein such that higher weighted contexts require lower frequency determinations and/or lower threshold number of sites before the context is used to determine an inferred attribute. For example, contexts of "boating" and "sailing" may both be employed to infer a leisure attribute of "sailing" for the online user; however, because the "sailing" context may be a more specific and therefore more reliable indicator of a "sailing" attribute for the user, the context "sailing" may be employed with a higher weight than "boating" when determining an inferred attribute of "sailing." Thus, some embodiments of the claimed invention may require a lower frequency or a lower number of sites threshold for the "sailing" context compared to the "boating" context, when determining whether to use either of these contexts to determine a "sailing" attribute for the online user.

Some embodiments of the claimed invention may employ a set of rules that are used to determine inferred attributes based on contexts for the online user. Such rules may incorporate the frequency threshold and/or number of sites threshold discussed herein, as well as the weights associated with various contexts. Moreover, the determination of at least one inferred attribute based on the at least one context for an online user may be considered a heuristic, and/or a heuristic modeling process. In such a heuristic process, the contexts for the online user may be used to determine one or more inferred attributes that may be used to predict future activities, interests, purchased products/services, and the like for the online user.

Figure 8:
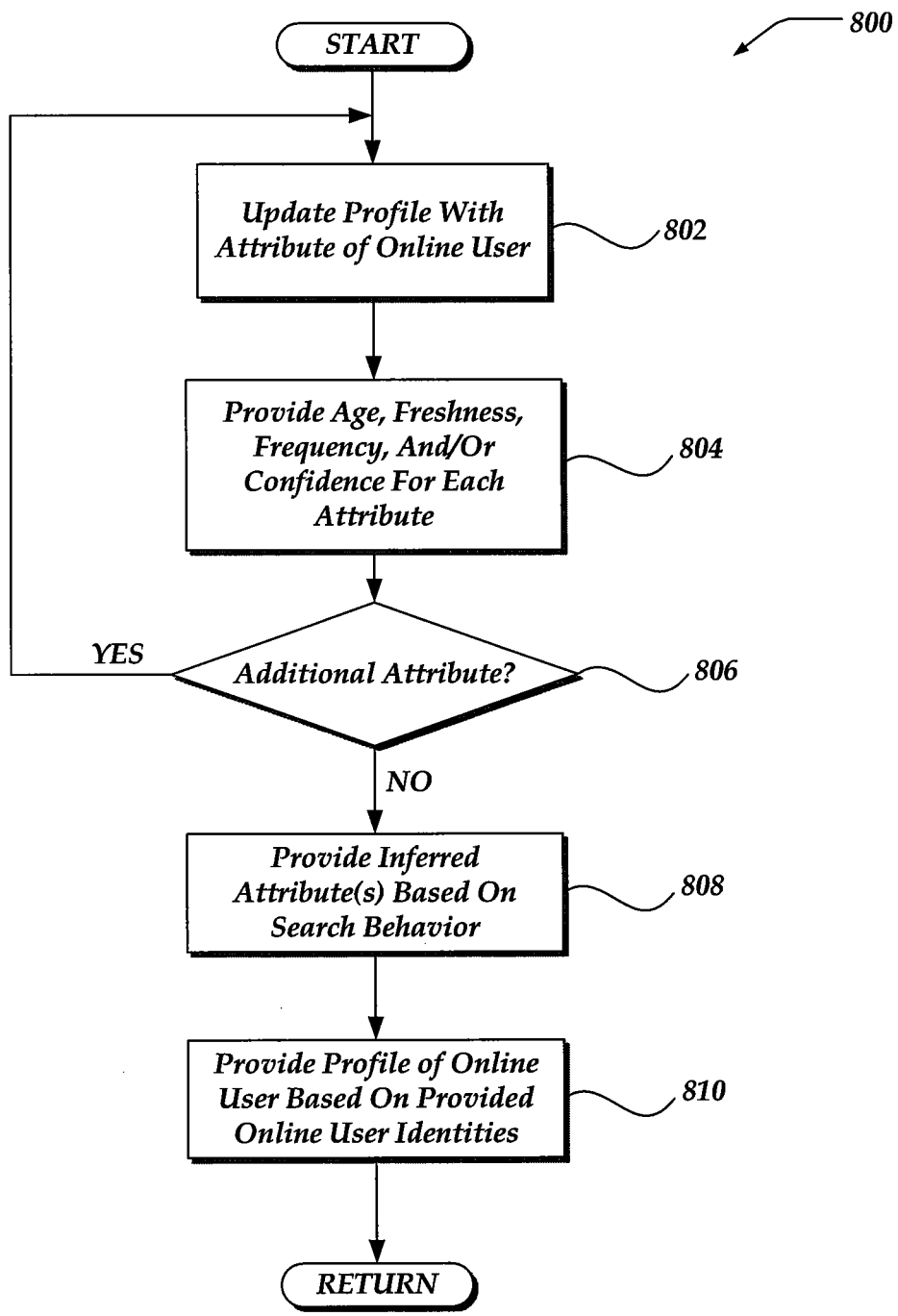
FIG. 8 illustrates a logical flow diagram generally showing one embodiment of a process of providing a profile of an online user, based on one or more attributes.

FIG. 8 depicts an exemplary process for providing the user profile based on the determined at least one inferred attribute. In some embodiments, process 800 shown in FIG. 8 may be spawned from block 412 of process 400. In some embodiments, process 800 may be implemented with profile server process 324 shown in FIG. 3, running on profile server device 154 shown in FIG. 1, or on another network device. Process 800, after a start block, proceeds to block 802 where it may update a profile of the online user based on an inferred attribute. Such an update may include adding an additional attribute for the user's profile, editing an inferred attribute already in the profile, or the like. In some embodiments, providing the profile may include updating an existing profile based on newly determined inferred attributes for the online user. In some embodiments, providing the profile may include creating or generating a new profile based on inferred attributes.

At block 804, process 800 may provide one or more characteristics for each inferred attribute, such as age, freshness, frequency, and/or confidence. Such characteristics may be provided for each inferred attribute based on one or more published updates that led to the inference of the inferred attribute for the online user. In some embodiments, age of an inferred attribute may indicate how long ago the published updates used to infer the attribute (by way of one or more determined contexts) were published by the online user. In some embodiments, a freshness characteristic of an inferred attribute may indicate how recently at least one published update was published to lead to inferring the attribute.

For example, an attribute of travel may be inferred for the online user, but may be determined to have low freshness because the online user has not mentioned travel in any published updates for at least one year. In some embodiments, frequency of an inferred attribute may indicate how frequently the online user publishes updates that lead to an inference of the attribute. In some embodiments, an inferred attribute may also be associated with a confidence metric, that may indicate a level of confidence (e.g. precision) that the inferred attribute was accurately inferred for the online user. Each of these characteristics may be a numeric indicator (e.g. on a scale of one to ten), or may be a more subjective and/or descriptive indicator (e.g., high, medium, or low).

Moreover, in some embodiments, a freshness characteristic may be based on both age and frequency of published updates. As an example, in some embodiments the claimed invention may receive indication of many (e.g., high frequency) published updates referring to Jamaica in a short, recent (e.g., low age) period of time, and may infer that the online user has recently developed an interest in Jamaica and/or that the online user is planning an imminent trip to Jamaica. A high freshness level may be determined for an inferred attribute of Jamaica, given that there has been a high frequency of mentions of Jamaica recently in the online user's published updates.

In some embodiments, characteristics of an inferred attribute such as age, freshness, confidence, frequency etc. may be used to determine whether an inferred attribute should be included in the profile for the online user. For example, in some embodiments the claimed invention may check whether the confidence characteristic of an inferred attribute is above a certain predetermined threshold level (e.g. greater than five on a scale of one to ten), and may include that inferred attribute in the profile is its confidence is greater than the predetermined threshold level. Similarly, other characteristics may be required to surpass predetermined thresholds before the inferred attribute is included in the profile. In some embodiments, such thresholds may depend on the type of inferred attribute analyzed. For example, in some embodiments the claimed invention may require a demographic attribute (e.g. the location of the home of the online user) to surpass a certain threshold X before it is included in the profile, but an inferred attribute related to interests, activities, hobbies, etc. may be required to surpass a different threshold Y before it is included in the profile. Generally, such thresholds may be expressed numerically (e.g. greater than eight on a scale of one to ten), or may be expressed descriptively and/or subjectively (e.g. "high" on a rating system of "high", "medium" and "low").

In some embodiments, a confidence of an inferred attribute may be further based on a background (e.g. baseline) context for that inferred attribute, related to external factors such as current events, holiday season, and the like. For example, in some embodiments the claimed invention may infer an attribute of CandidateX for the online user, based on mentions of CandidateX by online user in one or more published updates. However, the inferred attribute CandidateX may be assigned a low confidence characteristic if the published updates occurred during a political campaign when many other users were also mentioning CandidateX in their published updates. In such a case, a low confidence may be assigned to the inferred attribute to prevent ads related to that attribute from being served to the online user, because the online user has not expressed a particularly unique or noteworthy interest in CandidateX—online user in such a case is merely discussing a topic that everyone else is also discussing, in this example. However, if the online user mentions CandidateX in published updates published before or after the period of the political campaign, a higher confidence may be assigned to the inferred attribute.

Moreover, in some embodiments a determined confidence of an inferred attribute may be further based at least in part on possible ambiguities associated with the inferred attribute. For example, if the online user mentions "Battlestar Galactica" in one or more published updates, a high confidence may be assigned to an inferred attribute of Battlestar Galactica, given that the term is so specific that it is not likely to refer to anything except the popular television show(s). However, if the online user mentions "Idol" in a published update, there is more of an ambiguity associated with the term, because the online user may be referring to the television show "American Idol", the television show "Pop Idol", or may be referring to religious/artistic objects purchased, or other meanings. In such a case, the attribute Idol may be inferred for the online user, but with a lower confidence given the ambiguity. In some embodiments, the claimed invention may seek to develop a higher confidence in the inferred attribute based on the online user's location. For example, a mention of "Idol" may lead to an inference of attribute "American Idol" for the online user if the online user lives in the U.S. (where American Idol is televised), but may lead to an inference of attribute "Pop Idol" for the online user if the online user lives in the U.K. (where Pop Idol is televised).

Process 800 may then proceed to decision block 806, where it is determined whether an additional attribute has been determined or otherwise inferred for the online user. If so, the process returns to block 802 where the additional inferred attribute is used to update the profile. If it is determined at decision block 806 that no additional inferred attributes have been determined for the online user, process 800 may proceed to block 808 where one or more inferred attributes may be provided based on search behavior of the online user. In some embodiments, search behavior may include the online user entering search queries into a search engine. Such search queries may be archived by the search engine and/or other process, and the archived data may be analyzed, processed or otherwise used (e.g. mined) to determine inferred attributes for the online user. In some embodiments, the inferred attributes determined based on search behavior may be incorporated into the profile of the online user.

Process 800 may then proceed to block 810 where the online profile is provided based on the at least one online user identity such as that provided at block 402 of FIG. 4. Providing the profile of the online user may include saving the profile in memory, for example to RAM 316 or ROM 350 of a network device 300 such as profile server 154 of FIG. 1. Providing the profile may also include making the profile available to other processes running on the same or other devices, such as advertising server 155. After the profile is provided at block 806, process 800 may return, for example to block 412 of process 400.

In some embodiments, the profile of the online user may be a list or set of inferred attributes determined for the user, and the profile may include a confidence rating that describes a level of confidence for each determined attribute. The level of confidence may indicate how likely it is that the inferred attribute is associated with the online user (e.g. how accurately the attribute was inferred by the inventive process for the online user). For example, a user's profile may include an inferred attribute of "sailing" with a high level of confidence, and an inferred attribute of "science fiction literature" with a lower level of confidence. The level of confidence may be a numeric level of confidence, and may be on a predetermined scale (e.g. from 1 to 10, 10 being a highest level of confidence). The level of confidence may also be a more descriptive and/or subjective level (e.g., "high", "medium" or "low") for a particular attribute. The level of confidence may be determined based on the frequency for the context(s) used to determine an inferred attribute, as described herein. For example, if context "sailboat" is employed to determine an inferred attribute "sailing", the appearance of context "sailboat" 10 times in published updates may lead to a higher level of confidence for the inferred attribute "sailing" than if the context "sailboat" only appeared 3 times. Moreover, the level of confidence may also be determined based on the number of sites where the contexts used to infer the attribute appear, as described herein. Continuing the previous example, the context "sailboat" appearing on three difference sites may lead to a higher level of confidence for the inferred attribute "sailing" than if the context "sailboat" only appeared on one site.

In some embodiments, providing a profile of the online user may include providing a new profile of the online user, such as in an instance where no profile of the online user was previously created and/or stored. Providing the profile may then include creating a new profile that may include information identifying the online user such as user name, nick name, login, email address or other identifying information for the online user. In some embodiments, providing a profile of the online user may include updating an existing (e.g. a previously created and/or stored) profile of the online user. Updating a profile may then include adding newly determined inferred attributes for the online user to the existing profile, removing previously determined inferred attributes for the online user from the profile and/or replacing certain previously determined inferred attributes with newly determined inferred attributes, modifying previously determined inferred attributes for the online user based on newly determined inferred attributes, and the like. In some embodiments, the process may incorporate the provided profile into a general profile of the online user, and/or may incorporate a general profile into the provided profile, such that the inferred attributes for the online user included in the provided profile are combined and/or merged with attributes included in the general profile. Such a general profile may be a profile that is provided by another process or set of processes, either running on a same device as process 800 (e.g. profile server 154) or externally on some other device or server. In some embodiments, a general profile is a behavioral targeting profile determined for the online user by collecting and analyzing data related to search queries entered by the online user at a search engine. In some embodiments, the general profile may include attributes and/or other data regarding the user that has not been published by the user, and may not be public. For example, the general profile may include name, address, telephone, email, credit card/payment information, purchase history, and the like.

Figure 9:
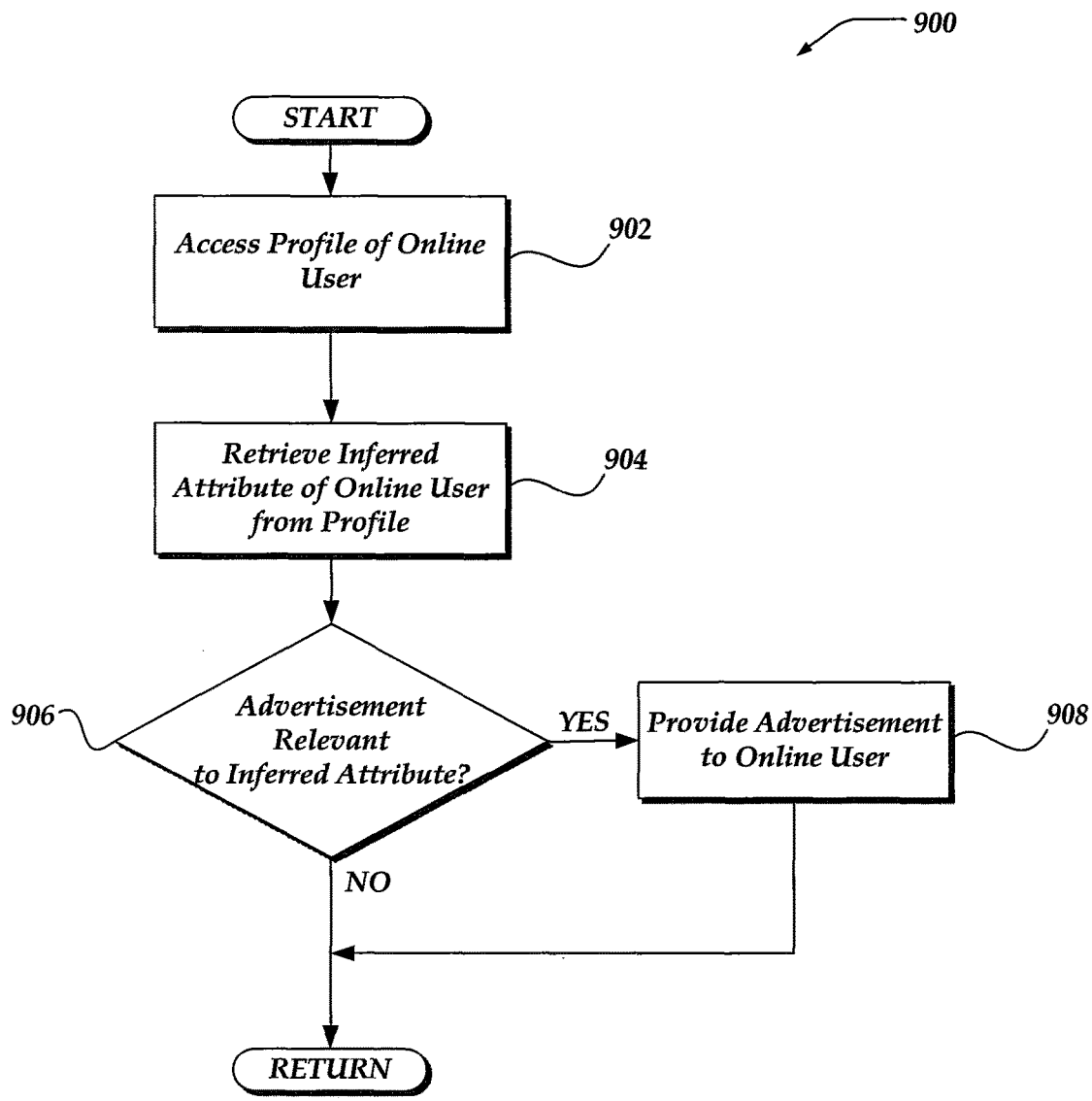
FIG. 9 illustrates a logical flow diagram generally showing one embodiment of a process of employing a profile of an online user to provide an advertisement to the online user.

In some embodiments, process 900 of FIG. 9 may be spawned from block 414 of process 400 as a sub-process of process 400, or other process. In some embodiments, process 900 may be implemented with profile server process 324 shown in FIG. 3, running on profile server device 154 shown in FIG. 1, or on another network device. Process 900, after a start block, proceeds to block 902 where it may access the profile of the online user. For example, the profile may have been stored in memory (e.g. RAM 316 or ROM 350 of a network device 300) such that accessing the profile may include loading and/or copying the profile from memory. In some embodiments, accessing the profile may include determining a pointer or other location of the profile (or of a beginning record of the profile) in memory, to enable subsequent processing of the profile while it remains stored in memory.

Process 900 may then proceed to block 904, where at least one inferred attribute of the online user may be retrieved from the profile. As described herein, in some embodiments the profile of the online user may be a list or set of inferred attributes determined for the online user. Retrieving at least one inferred attribute from the online user profile may include searching the profile for one or more attributes or sets of attributes, by traversing a data structure in which the profile is stored (e.g. searching, traversing and/or walking a linked list, tree structure, flat file or the like). The process may then proceed to decision block 906, where the process may determine whether one or more advertisements are relevant to the inferred attribute retrieved from the profile. If so, the process may provide the one or more advertisements to the online user at block 908. Otherwise, process 900 may return.

Providing one or more advertisements to the online user may include, for example, providing an advertisement in the form of a text message, SMS message, MMS message, email, chat message or the like to the online user's client device such as device 101 and/or mobile device 102. In some embodiments, providing an advertisement may include serving web content to a browser running on the online user's device. In some embodiments, the one or more advertisements may be provided from the same device executing process 400 and/or process 900 (e.g. profile server 154). In some embodiments, the one or more advertisements may be provided from another device, such as advertising server 155 shown in FIG. 1. In some embodiments, the one or more advertisements may be provided by a third party (e.g. a vendor, advertising agency, advertising aggregator, online server provider, or the like) and each advertisement provided may be associated with one or more attributes for users. In some embodiments, association between advertisement(s) and attributes may be made by the provider of the advertisement, to reflect one or more segments (e.g. or population, demographic, or the like) of online users that the provider of the advertisement may wish to target with the advertisement. In some embodiments, such association may be made as part of a service provided to the provider of the advertisement by a party that manages, operates, or otherwise controls profile server 154.

It will be understood that each block of the flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems which perform the specified actions or steps, or combinations of special purpose hardware and computer instructions.

Figure 10B:
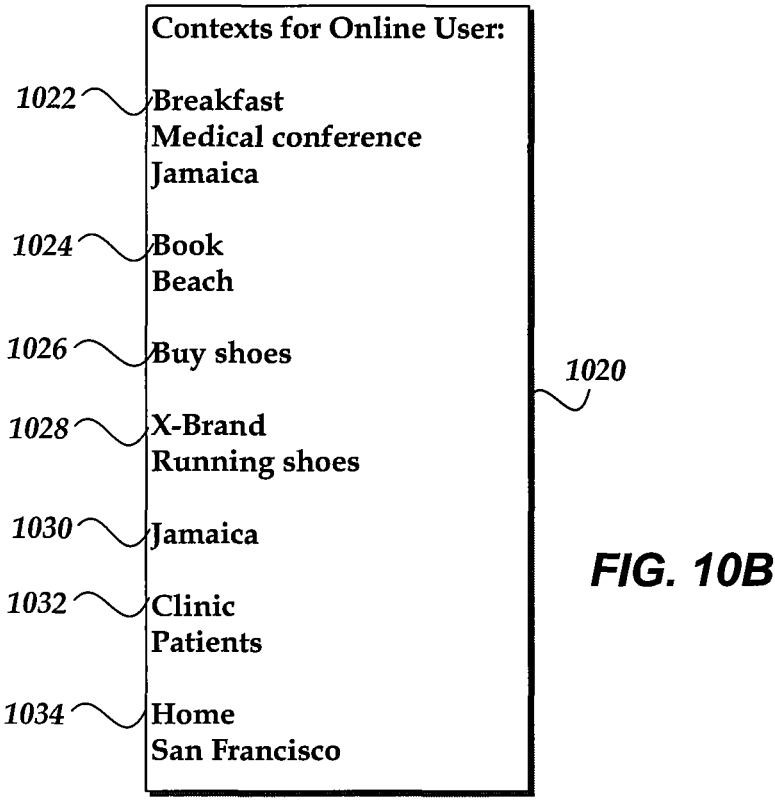
FIG. 10B illustrates non-limiting examples of contexts for an online user.
Figure 10C:
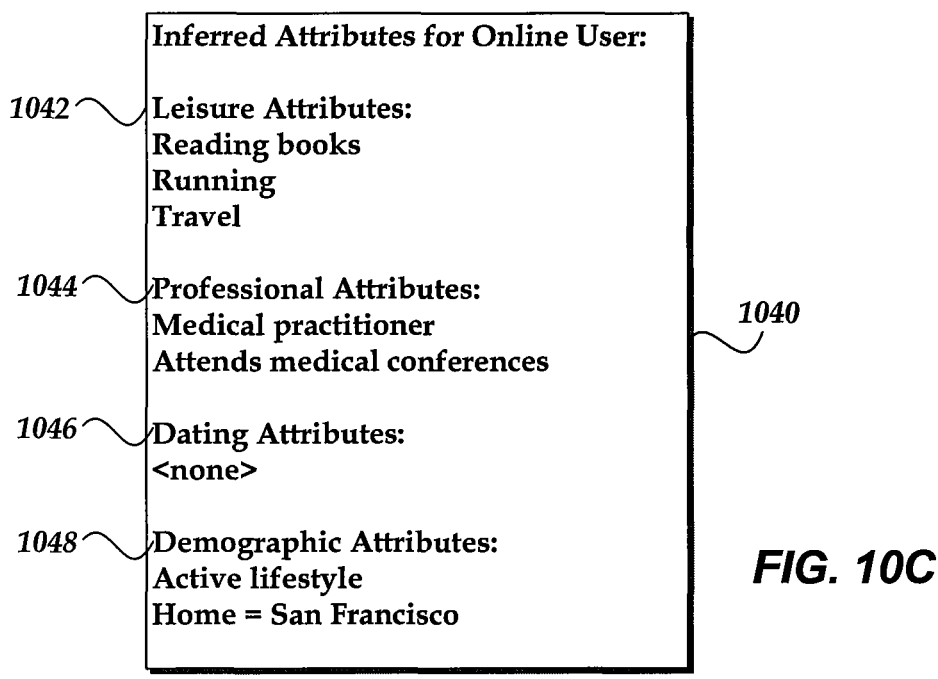
FIG. 10C illustrates non-limiting examples of inferred attributes for an online user.

FIGS. 10A, 10B and 10C provide non-limiting examples of an operation of an embodiment. FIG. 10A shows examples of published updates 1000 for an online user. The updates shown in FIG. 10A are examples of status updates that may be published on a blog or micro-blog, but similar updates may be published at other types of sites such as online chat services, social networking services, online albums, online forums, or the like. In some embodiments, status updates may be published by the online user herself, and may be described as self-published. As shown in FIG. 10A, status updates may include a date/time stamp (e.g. "2/15/20xx 0830" as shown in element 1002) along with text for the update. Though not shown in FIG. 10A, the content of a status update may include video, audio, graphics, image, or other forms of content as well as text, or in place of text.

FIG. 10B shows an example of a set of one or more contexts 1020 for the online user that may be determined based on the published updates shown in FIG. 10A. For example, published update 1002 "Eating breakfast, getting ready for medical conference in Jamaica!" may be used to determine contexts 1022 of "breakfast", "medical conference" and/or "Jamaica" for the online user. Published update 1004 "Warm and sunny in Jamaica, reading a book on the beach" may be used to determine contexts 1024 of "book" and "beach" for the online user as well as (though not shown in FIG. 10B) a context of "Jamaica". Published update 1006 "Returning home tomorrow, need to buy new shoes" may be used to determine contexts 1026 of "shoes" and/or "buy shoes" (e.g. a context indicating a user is interested in purchasing shoes). Published update 1008 "Love my new X-Brand running shoes" may be used to determine contexts 1028 of "X-Brand" and "running shoes" for the online user. Published update 1010 "Check out pictures from my Jamaica trip, at www.sml.com/abcde" may be used to determine context 1030 of "Jamaica" for the online user. Published update 1012 "Very busy at the clinic today; backlog of patients" may be used to determine contexts 1032 of "clinic" and/or "patients" for the online user.

In some embodiments, where an online user's inclusion of a URL and/or address of another web site in an online update (e.g. as in online update 1010 of FIG. 10A which includes a URL www.sml.com/abcde), determining at least one context regarding the user based on the at least one published update may further include analyzing the content posted at that URL to determine whether the online user has published any additional updates at the other site. In such a case, analysis of the published updates at the other site may be performed to determine one or more additional contexts for the online user.

FIG. 10C shows an example of a set of one or more inferred attributes 1040 of the online user that may be determined by employing contexts (e.g. contexts 1020 in FIG. 10B) determined for the online user. For example, leisure attributes 1042 of "reading books", "running" and "travel" may be determined based on contexts such as contexts 1024 "book" and/or "beach", contexts 1028 "running shoes" and/or contexts 1022 and 1030 "Jamaica". Professional attributes 1044 "medical practitioner" and/or "attends medical conferences" may be determined based on contexts such as contexts 1022 "medical conference" and 1032 "clinic" and "patients". In this example, dating attributes 1046 may be empty (e.g. a null set, blank or otherwise unpopulated) if none of the determined contexts are relevant to dating. In some embodiments, an absence of contexts and or published updates for the online user related to a spouse, partner, romantic interest or the like may lead to an inference of a dating attribute of "single" for the online user. Demographic attributes 1048 of "active lifestyle" may be determined based on such contexts as contexts 1028 "running shoes". The determined attributes 1040 may be used to provide a profile of the online user, to enable one or more advertisements (or other relevant content) to be provided to the online user where the advertisement(s) are at least associated or otherwise relevant to at least one of the inferred attributes of the online user.

Though not shown in FIG. 10C, in some embodiments inferred attributes 1040 may be weighted based on a frequency at which the employed contexts occur in the published updates for the online user, and/or based on the number of sites where the relevant published updates are published. For example, the determination of at least two occurrences of "Jamaica" (e.g. elements 1022 and 1030 of FIG. 10B) as a context for the online user may lead to a determination of a higher frequency (e.g. a frequency of 2) for the context than the context "book". Subsequently, the leisure attribute of "travel" for the online user may be assigned a higher weight in the user profile. Moreover, in some embodiments, there may be a minimum number of occurrences of a context required before that context is used to determine an attribute. For example, if the minimum number of context occurrences is 2, then context "Jamaica" may be used to determine an attribute but context "book" may not be used.

As described herein with regard to FIG. 7, inferring an attribute for the online user may include a correlation of contexts determined for the online user. For example, FIG. 10A shows a published update 1006, in which the online user states "Returning home to San Francisco tomorrow." Based at least on this published update, contexts of "home" and "San Francisco" may be determined for the online user, as shown by element 1034 of FIG. 10B. These contexts may be correlated to infer a demographic attribute that Home=San Francisco for the online user (e.g., the online user's home is in San Francisco), as shown in element 1048 of FIG. 10C. This correlation may be based at least in part on the proximity of the words "home" and "San Francisco" in published update 1006. In some embodiments, the confidence measure for such a demographic attribute Home=San Francisco may be higher the closer the words "home" and "San Francisco" occur to each other in the published update, and confidence may generally be increased when two such words appear in the same status update on the same web page. In this way, the claimed inventive may heuristically predict that the online user's home is in San Francisco based on the correlation of words and/or phrases in published updates, with a higher confidence for such prediction based on the proximity of the words and/or phrases, the frequency of their occurrence in published updates for the online user, age of the published updates, freshness of the published updates, or other measured characteristics of the published updates.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method comprising:
   receiving, by a content system server, an indication of an update supplied by an online user to online information about the online user being published by a plurality of online sites;
   determining, by the content system server and using the received indication, a specific number of online sites publishing the online information update supplied by the online user;
   making a determination, by the content system server, that the determined number of online sites publishing the online information update satisfies a predetermined threshold number of online sites, the predetermined number of online sites reflecting a desired level of confidence in the online information about the user;
   making, by the content system server, a determination, using the determination that the number of online sites publishing the online information update satisfies the predetermined threshold number of online sites, to use the online information update to determine a context and an attribute for the online user;
   determining, by the content system server, the context regarding the online user using the online information update, the context determination comprising analyzing the online information update for a predetermined keyword indicating the context;
   employing, by the content system server, the predetermined keyword indicating the context to determine the attribute of the online user;
   generating, by the content system server, a user profile of the online user based at least in part on the determined attribute, the generated user profile comprising the determined attribute;
   employing, by the content system server, the generated user profile to automatically identify at least one content item to provide to the online user at the online user's computing device, the at least one content item is at least associated with the attribute determined using the context determined using the online information update determined to be published online by at least the predetermined threshold number of online sites; and
   communicating, by the content system server, the at least one content item to the online user's computing device over an electronic communications network, communication of the at least one content item to the online user's computing device causing the at least one content item to be output at the online user's computing device.

2. The method of claim 1, wherein the indication of the update is associated with at least one of a blog, a social networking site, a micro-blog, a chat service, an online forum, or an online album.

3. The method of claim 1, wherein the update includes at least one of a location, a product, a service, or an activity.

4. The method of claim 1, wherein employing the context to determine the attribute of the online user further comprises correlating the context with at least one other context determined for the user.

5. The method of claim 1, wherein the attribute is at least one of a leisure attribute, a professional attribute, a dating attribute, or a demographic attribute for the online user.

6. The method of claim 1, wherein providing the profile includes providing a new profile of the online user.

7. The method of claim 1, wherein providing the profile includes updating an existing profile of the online user.

8. The method of claim 1, further comprising incorporating the provided profile into a general profile of the online user.

9. The method of claim 1, wherein providing the profile of the online user is further based on general information associated with the online user and published by the online user.

10. The method of claim 1, wherein employing the context to determine the attribute of the online user includes determining a frequency at which the context occurs in the update, and wherein the attribute is further based on the determined frequency.

11. The method of claim 1, wherein the update is published on a micro-blog.

12. The method of claim 1, wherein the context includes a weight based on different threshold numbers of sites that each publish the update.

13. A content system server comprising:
a network interface to send and receive data over a network;
a processor; and
a storage medium for tangibly storing thereon program logic for execution by the processor, the stored program logic comprising:
receiving logic executed by the processor for receiving an indication of an update supplied by an online user to online information about the online user being published by a plurality of online sites;
determining logic executed by the processor for determining, using the received indication, a specific number of online sites publishing the online information update supplied by the online user;
determining logic executed by the processor for making a determination that the determined number of online sites publishing the online information update satisfies a predetermined threshold number of online sites, the predetermined number of online sites reflecting a desired level of confidence in the online information about the user;
determining logic executed by the processor for making a determination, using the determination that the number of online sites publishing the online information update satisfies the predetermined threshold number of online sites, to use the online information update to determine a context and an attribute for the online user;
determining logic executed by the processor for determining the context regarding the online user using the online information update, the context determination comprising analyzing the online information update for a predetermined keyword indicating the context;
employing logic executed by the processor for employing the predetermined keyword indicating the context to determine the attribute of the online user;
generating logic executed by the processor for generating a user profile of the online user based at least in part on the determined at least one attribute, the generated user profile comprising the determined attribute;
employing logic executed by the processor for employing the generated user profile to automatically identify at least one content item to provide to the online user at the online user's computing device, the at least one content item is at least associated with the attribute determined using the context determined using the online information update determined to be published online by at least the predetermined threshold number of online sites; and
communicating logic executed by the processor for communicating the at least one content item to the online user's computing device over an electronic communications network, communication of the at least one content item to the online user's computing device causing the at least one content item to be output at the online user's computing device.

14. The content system server of claim 13, the employing logic executed by the processor for employing the context to determine at least one attribute of the online user further comprising correlating logic executed by the processor for correlating the context with at least one other context determined for the user.

15. The content system server of claim 13, the employing logic executed by the processor for employing the context to determine the attribute of the online user further comprising determining logic executed by the processor for determining a frequency at which the context occurs in the update, the attribute is further based on the determined frequency.

16. A computer readable non-transitory storage medium storing thereon computer readable instructions that when executed by a content system server perform a method comprising:
receiving an indication of an update by a user to online information about the online user being published by a plurality of online sites;
determining, using the received indication, a specific number of online sites publishing the online information update supplied by the online user;
making a determination that the determined number of online sites publishing the online information update satisfies a predetermined threshold number of online sites, the predetermined number of online sites reflecting a desired level of confidence in the online information about the user;
making a determination, using the determination that the number of online sites publishing the online information update satisfies the predetermined threshold number of online sites, to use the online information update to determine a context and an attribute for the online user;
determining the context regarding the online user using the online information update, the context determination comprising analyzing the online information update for a predetermined keyword indicating the context;
employing predetermined keyword indicating the context to determine the attribute of the online user;
generating a user profile of the online user based at least in part on the determined at least one attribute, the generated user profile comprising the determined attribute;

employing the generated user profile to automatically identify at least one content item to provide to the online user at the online user's device, the at least one content item is at least associated with the attribute determined using the context determined using the online information update determined to be published online by at least the predetermined threshold number of online sites; and communicating the at least one content item to the online user's computing device over an electronic communications network, communication of the at least one content item to the online user's computing device causing the at least one content item to be output at the online user's computing device.

17. The processor readable storage medium of claim 16, wherein the update is published on a micro-blog.

18. The processor readable storage medium of claim 16, wherein employing the context to determine the attribute of the online user includes determining a frequency at which the context occurs in the update, and wherein the attribute is further based on the determined frequency.

\* \* \* \* \*